US012631443B2

(12) United States Patent
Miyaki et al.

(10) Patent No.: US 12,631,443 B2
(45) Date of Patent: May 19, 2026

(54) PROBE FOR THREE-DIMENSIONAL SCANNER AND THREE-DIMENSIONAL SCANNER

(71) Applicant: Keyence Corporation, Osaka (JP)

(72) Inventors: Yuji Miyaki, Osaka (JP); Masayasu Ikebuchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 150 days.

(21) Appl. No.: 18/398,269

(22) Filed: Dec. 28, 2023

(65) Prior Publication Data

US 2024/0263939 A1 Aug. 8, 2024

(30) Foreign Application Priority Data

Feb. 7, 2023 (JP) ................................. 2023-016758
Feb. 7, 2023 (JP) ................................. 2023-016761

(51) Int. Cl.
*G01B 11/25* (2006.01)
*G01B 5/00* (2006.01)
*G01S 17/42* (2006.01)

(52) U.S. Cl.
CPC .............. *G01B 11/254* (2013.01); *G01B 5/00* (2013.01); *G01B 11/25* (2013.01); *G01S 17/42* (2013.01)

(58) Field of Classification Search
CPC ........ G01B 11/254; G01B 5/00; G01B 11/25; G01S 17/42
See application file for complete search history.

(56) References Cited

U.S. PATENT DOCUMENTS

| | | | |
|---|---|---|---|
| 8,082,120 B2 * | 12/2011 | St-Pierre ................ | G01C 11/02 |
| | | | 356/601 |
| 9,551,566 B2 | 1/2017 | Wakai | |
| 9,557,159 B2 | 1/2017 | Ikebuchi | |
| 9,778,023 B2 | 10/2017 | Osaki et al. | |
| 9,885,564 B2 | 2/2018 | Osaki et al. | |
| 10,267,620 B2 * | 4/2019 | Ikebuchi .............. | G06T 7/0004 |

(Continued)

FOREIGN PATENT DOCUMENTS

| | | | | |
|---|---|---|---|---|
| CN | 106679590 A | * | 5/2017 | ......... G01B 11/2518 |
| JP | 2015190927 A | | 11/2015 | |
| WO | WO-2018140656 A1 | * | 8/2018 | ............. H04N 23/45 |

OTHER PUBLICATIONS

U.S. Appl. No. 18/398,259, filed Dec. 28, 2023 (52 pages).

*Primary Examiner* — Kara E. Geisel
*Assistant Examiner* — Judy Dao Tran
(74) *Attorney, Agent, or Firm* — Kilyk & Bowersox, P.L.L.C.

(57) ABSTRACT

Favorable measurement workability is obtained by further enhancing a degree of freedom in handling a probe while enhancing measurement accuracy. A probe for a three-dimensional scanner includes a first marker block and a second marker block that are arrayed side by side in a first direction with a scanner unit positioned at a center, and a third marker block and a fourth marker block that are arrayed side by side in a second direction with the scanner unit positioned at the center. The marker blocks have self-luminous markers facing a plurality of directions, respectively. The fourth marker block is arranged to be separated from a plane defined by the first marker block, the second marker block, and the third marker block.

18 Claims, 16 Drawing Sheets

(56)     References Cited

U.S. PATENT DOCUMENTS

| | | | | |
|---|---|---|---|---|
| 10,619,994 | B2 | 4/2020 | Futami | |
| 10,739,126 | B2 | 8/2020 | Ikebuchi | |
| 10,817,160 | B2 | 10/2020 | Ikebuchi | |
| 10,837,757 | B1 | 11/2020 | Ikebuchi | |
| 2008/0273194 | A1* | 11/2008 | De Sloovere | G01B 11/25 |
| | | | | 356/139.09 |
| 2010/0134598 | A1* | 6/2010 | St-Pierre | G01B 11/2513 |
| | | | | 348/47 |
| 2011/0105910 | A1* | 5/2011 | Lawson | A61B 5/0086 |
| | | | | 600/474 |
| 2015/0346330 | A1* | 12/2015 | Markendorf | G01S 17/06 |
| | | | | 356/4.07 |
| 2016/0073091 | A1* | 3/2016 | Hillebrand | G06T 7/62 |
| | | | | 348/48 |
| 2017/0314910 | A1* | 11/2017 | Ikebuchi | G06T 7/73 |
| 2019/0137259 | A1* | 5/2019 | Mori | G01B 11/26 |
| 2020/0041250 | A1* | 2/2020 | Ikebuchi | G01B 5/008 |
| 2022/0124253 | A1* | 4/2022 | Ossig | G06T 7/80 |
| 2022/0342047 | A1* | 10/2022 | Moscovici | G01S 17/931 |
| 2022/0412721 | A1 | 12/2022 | Miyaki et al. | |

* cited by examiner

2

29 107 24 75 110a 73 21
103 101 51 29
71

54

52

110a
112

75
66 65
110

112a CON
83
87 22 29
81

64
62
63
20
60
111
62

110a

91

53
95 23 93 29

FRONT ← → REAR

UP

DOWN

PROBE FOR THREE-DIMENSIONAL SCANNER AND THREE-DIMENSIONAL SCANNER

CROSS-REFERENCE TO RELATED APPLICATIONS

The present application claims foreign priority based on Japanese Patent Application No. 2023-016758, filed Feb. 7, 2023, and No. 2023-016761, filed Feb. 7, 2023, the contents of which are incorporated herein by references.

BACKGROUND OF THE INVENTION

1. Technical Field

The disclosure relates to a three-dimensional scanner and a probe for a three-dimensional scanner used at the time of three-dimensional measurement by the three-dimensional scanner.

2. Description of the Related Art

For example, JP 2015-190927 A discloses an optical coordinate measuring device including a probe for designating a measurement position and a calculation unit that calculates a coordinate of the measurement position designated by the probe. The probe includes a plurality of markers spaced apart from each other.

At the time of measurement, an imaging part configured separately from the probe can capture images of the markers of the probe to generate image data, and the calculation unit can calculate the coordinate of the measurement position based on the image data generated by the imaging part.

When the probe and the imaging part that captures an image of the probe are separately provided as in the measuring device of JP 2015-190927 A, a degree of freedom in handling the probe at the time of measurement is improved and measurement workability is improved.

However, in the probe of JP 2015-190927 A, the markers are provided only on a front surface located opposite to a side gripped by a worker, and thus, it is necessary to always orient the front surface of the probe toward the imaging part at the time of measurement, and an orientation and a posture of the probe at the time of measurement are restricted.

In particular, in a case where the measurement target is a large member or a measurement site is present on the back side as viewed from the imaging part, it is difficult to always orient the imaging part toward the front surface of the probe, which may cause trouble in measurement.

Further, in the probe of JP 2015-190927 A, the markers are provided only on a front surface located opposite to a side gripped by a worker, and thus, it is necessary to always orient the front surface of the probe toward the imaging part at the time of measurement, and an orientation and a posture of the probe at the time of measurement are restricted.

In particular, in a case where the measurement target is a large member or a measurement site is present on the back side as viewed from the imaging part, it is difficult to always orient the imaging part toward the front surface of the probe, which may cause trouble in measurement.

In this regard, it is conceivable to increase the number of markers, but measurement accuracy is adversely affected if a relative positional relationship of the markers changes over time, and thus, it is difficult to simply increase the number of markers. For example, when an optical base is made of quartz and all the markers are attached to the optical base as in JP 2015-190927 A, there is almost no influence from changes in ambient temperature and humidity, and the measurement accuracy can be enhanced. However, the optical base inevitably becomes large if an attempt is made to increase the number of markers as compared with that in JP 2015-190927 A, which causes problems in cost, weight, and the like in order to obtain such a large optical base made of quartz.

SUMMARY OF THE INVENTION

The disclosure has been made in view of such a point, and an object thereof is to obtain favorable measurement workability by further enhancing a degree of freedom in handling a probe while enhancing measurement accuracy. Another object thereof is to improve measurement accuracy by maintaining a relative positional relationship of a plurality of markers constant regardless of a surrounding environment while solving problems of cost and weight.

In order to achieve the above-described objects, according to one embodiment, a probe for a three-dimensional scanner having a plurality of markers of which images are captured by an imaging unit can be assumed. The probe includes: a scanner unit including a scanner light source that emits pattern light in a measurement direction and a scanner imaging part that captures an image of the pattern light emitted by the scanner light source in the measurement direction to generate a bright line image; a pair of marker blocks including a first marker block and a second marker block arrayed side by side in a first direction in a state where the scanner unit is positioned at a center; and a pair of marker blocks including a third marker block and a fourth marker block arrayed side by side in a second direction in a state where the scanner unit is positioned at the center. Each of the marker blocks has self-luminous markers facing a plurality of directions, respectively. The fourth marker block is arranged to be separated from a plane defined by the first marker block, the second marker block, and the third marker block.

According to this configuration, the first marker block and the second marker block are arrayed in the first direction, the third marker block and the fourth marker block are arrayed in the second direction, the fourth marker block is separated from the plane defined by the first marker block, the second marker block, and the third marker block, and each of the first to fourth marker blocks has the self-luminous markers emitting light in the plurality of directions. Thus, even if an orientation and a posture of the probe change variously, the number of markers necessary for measurement is arranged to face the imaging unit, and images of the plurality of markers can be captured by the imaging unit.

Further, since the first marker block and the second marker block are arranged so as to sandwich the scanner unit, a sufficient distance between the first marker block and the second marker block is secured. Similarly, since the third marker block and the fourth marker block are arranged so as to sandwich the scanner unit, a sufficient distance between the third marker block and the fourth marker block is also secured. Thus, the distance between the self-luminous markers of which images are captured by the imaging unit becomes long, and measurement accuracy is improved.

The plane is, for example, a virtual plane. This virtual plane may be, for example, a plane passing through a center of gravity of the first marker block, a center of gravity of the second marker block, and a center of gravity of the third marker block, or may be a plane passing through a center of the first marker block, a center of the second marker block, and a center of the third marker block. Further, it can also be said that the fourth marker block is separated from the virtual plane in a Z direction when the virtual plane is an XY plane.

A longitudinal direction of a probe body including the scanner unit can be a first direction, and in this case, the pair of marker blocks including the first marker block and the second marker block can be provided at both ends of the probe body in the longitudinal direction.

Further, the pair of marker blocks including the third marker block and the fourth marker block can be provided at positions offset from the scanner unit in the measurement direction.

Further, an array direction of the pair of marker blocks including the first marker block and the second marker block and an array direction of the pair of marker blocks including the third marker block and the fourth marker block may be set to be orthogonal to each other as viewed from the measurement direction.

Further, among surfaces of each of the pair of marker blocks, a first surface and a second surface farthest from the first surface may be arranged in parallel to each other. In this case, the marker can be arranged on each of the first surface and the second surface.

Further, a plurality of side surfaces intersecting the first surface and the second surface may be formed in the marker block. In this case, the marker can be arranged on each of the plurality of side surfaces.

Further, the plurality of side surfaces may be formed in each of the first marker block and the second marker block. In this case, the plurality of side surfaces formed in the second marker block can be arranged such that positions about an axis extending in the first direction are shifted from those of the plurality of side surfaces formed in the first marker block. That is, when the axis extending in the first direction is used as a reference, it is possible to make phases of the side surface of the first marker block and the side surface of the second marker block different.

Further, the probe may further include an optical base to which the scanner light source and the scanner imaging part are attached, and a grip part gripped by a measurement worker. In this case, the grip part is arranged to be distant from the optical base toward the side opposite to the measurement direction, and thus, it is possible to prevent the grip part and a hand of the measurement worker from interfering with measurement, and heat of the hand of the measurement worker is hardly transmitted to the optical base so that it is possible to avoid deterioration of the measurement accuracy due to thermal expansion.

The grip part can be provided with a display unit for displaying a measurement result obtained by the scanner unit and an operation unit for operating the scanner unit. As a result, visibility of the measurement result and operability of the operation unit are improved.

According to one embodiment, it is also possible to configure a three-dimensional scanner including the probe, an imaging unit that captures images of a plurality of markers, and a processing unit that measures a three-dimensional shape of a measurement target based on a marker image generated by the imaging unit and a bright line image generated by the probe.

According to one embodiment, a probe for a three-dimensional scanner having a plurality of markers of which images are captured by an imaging unit can be assumed. The probe includes: a scanner unit including a scanner light source that emits pattern light in a measurement direction and a scanner imaging part that captures an image of the pattern light emitted by the scanner light source in the measurement direction; a plurality of marker blocks arranged around the scanner unit; and a support part that is made of metal and supports each of the marker blocks with respect to the scanner unit. Each of the plurality of marker blocks has a marker holder that positions and fixes self-luminous markers facing a plurality of directions, respectively, and is made of a material having a lower thermal expansion coefficient than the support part.

According to this configuration, the self-luminous markers are provided in each of the plurality of marker blocks, and thus, not only the number of markers can be increased, but also a distance between the markers can be sufficiently secured, and the measurement accuracy is improved. Since the marker holder provided in each of the plurality of marker blocks is made of a material having a lower thermal expansion coefficient than the support part that supports the marker block, a positional relationship between the plurality of markers of each of the marker blocks is kept constant regardless of a surrounding environment, and thus, the measurement accuracy is improved. That is, highly accurate measurement can be performed if only a positional relationship between the marker blocks is corrected in accordance with the surrounding environment.

Further, the marker holder may have a polygonal column shape, for example, a column shape having a polygonal cross-section such as a quadrangle, a pentagon, or a hexagon. In this case, one surface of the polygonal column shape in the marker holder may be an attachment surface to be attached to the support part, and at least one marker may be provided on each surface other than the attachment surface. As a result, the number of markers provided in each of the marker blocks can be increased, and all the markers provided in each marker block can be oriented in different directions. Thus, even if the orientation and posture of the probe change variously at the time of measurement, the number of markers necessary for measurement are arranged to face the imaging unit, and images of the plurality of markers can be captured by the imaging unit. Further, one end surface of the polygon in an axial direction may be the attachment surface, and in this case, at least one marker can be provided on the other end surface of the polygon in the axial direction.

Further, the marker may include a marker light source and a diffusion plate that diffuses light emitted from the marker light source. In this case, the diffusion plate can be formed to be larger than a region where the marker light source is arranged as viewed along an optical axis direction of the marker. When a thickness of a central portion of the diffusion plate is set to be thicker than that of a peripheral portion, the light is easily attenuated at the central portion of the diffusion plate, and beams of light of the markers are made uniform.

Further, an exterior member that covers the optical base to which the scanner light source and the scanner imaging part are attached and the support part may be further provided. In this case, in the exterior member, a grip part can be provided at a position distant from the optical base toward the side opposite to the measurement direction. As a result, it is possible to prevent the grip part and the hand of the measurement worker from interfering with the measurement, and the heat of the hand of the measurement worker is hardly transmitted to the optical base so that it is possible to avoid the deterioration of the measurement accuracy due to the thermal expansion.

The exterior member may include a scanner cover part that covers the scanner light source and the scanner imaging part, the grip part may have a hollow shape communicating with the inside of the scanner cover part, and an air discharge port for discharging air inside the grip part may be formed at an end of the grip part. As a result, exhaust heat of the scanner light source and the scanner imaging part is discharged from the end of the grip part, and thus, the exhaust heat hardly reaches the periphery of the marker, and high measurement accuracy can be maintained.

Further, the exterior member may be unfastened to the marker holder. The term "unfastened" means a state where the exterior member is not fastened to the marker holder with a fastening member such as a screw or a bolt. As a result, a force hardly acts on the marker holder from the exterior member, and thus, positional accuracy of the plurality of markers can be maintained in a high state.

According to one embodiment, it is also possible to configure a three-dimensional scanner including the probe, an imaging unit that captures images of the plurality of markers, and a processing unit configured to be capable of acquiring three-dimensional coordinates of a measurement target. The imaging unit can generate a marker image including a plurality of self-luminous markers by capturing images of the self-luminous markers provided in the probe. The processing unit includes: a storage unit that stores arrangement information of each of the self-luminous markers in the marker blocks; an acquisition unit that acquires misalignment information between the plurality of marker blocks caused by a temperature change of the scanner unit based on the arrangement information of the self-luminous markers stored in the storage unit; and a calculation unit that calculates the three-dimensional coordinates of the measurement target based on the bright line image generated by the scanner imaging part, a position and a posture of the plurality of markers included in the marker image generated by the imaging unit, and the misalignment information acquired by the acquisition unit.

As described above, the first marker block and the second marker block that are arrayed in the first direction so as to sandwich the scanner unit and the third marker block and the fourth marker block that are arrayed in the second direction so as to sandwich the scanner unit are provided, and the fourth marker block is separated from the plane defined by the first to third marker blocks. Thus, even if the orientation and posture of the probe change variously, the imaging unit can capture images of the number of self-luminous markers necessary for measurement, and a sufficient distance between the captured markers can be secured. As a result, it is possible to further obtain more favorable measurement workability by further enhancing the degree of freedom in handling the probe while enhancing the measurement accuracy.

Further, the plurality of marker blocks are supported by the support part made of metal, and each of the plurality of marker blocks has the marker holder that positions and fixes the self-luminous markers facing the plurality of directions, respectively, and is made of the material having a lower thermal expansion coefficient than the support part. Thus, it is possible to improve the measurement accuracy by maintaining the relative positional relationship of the plurality of markers constant regardless of the surrounding environment while solving the problems of cost and weight.

DETAILED DESCRIPTION

Hereinafter, an embodiment of the invention will be described in detail with reference to the drawings. Note that the following preferred embodiment is described merely as an example in essence, and there is no intention to limit the invention, its application, or its use.

Figure 1:
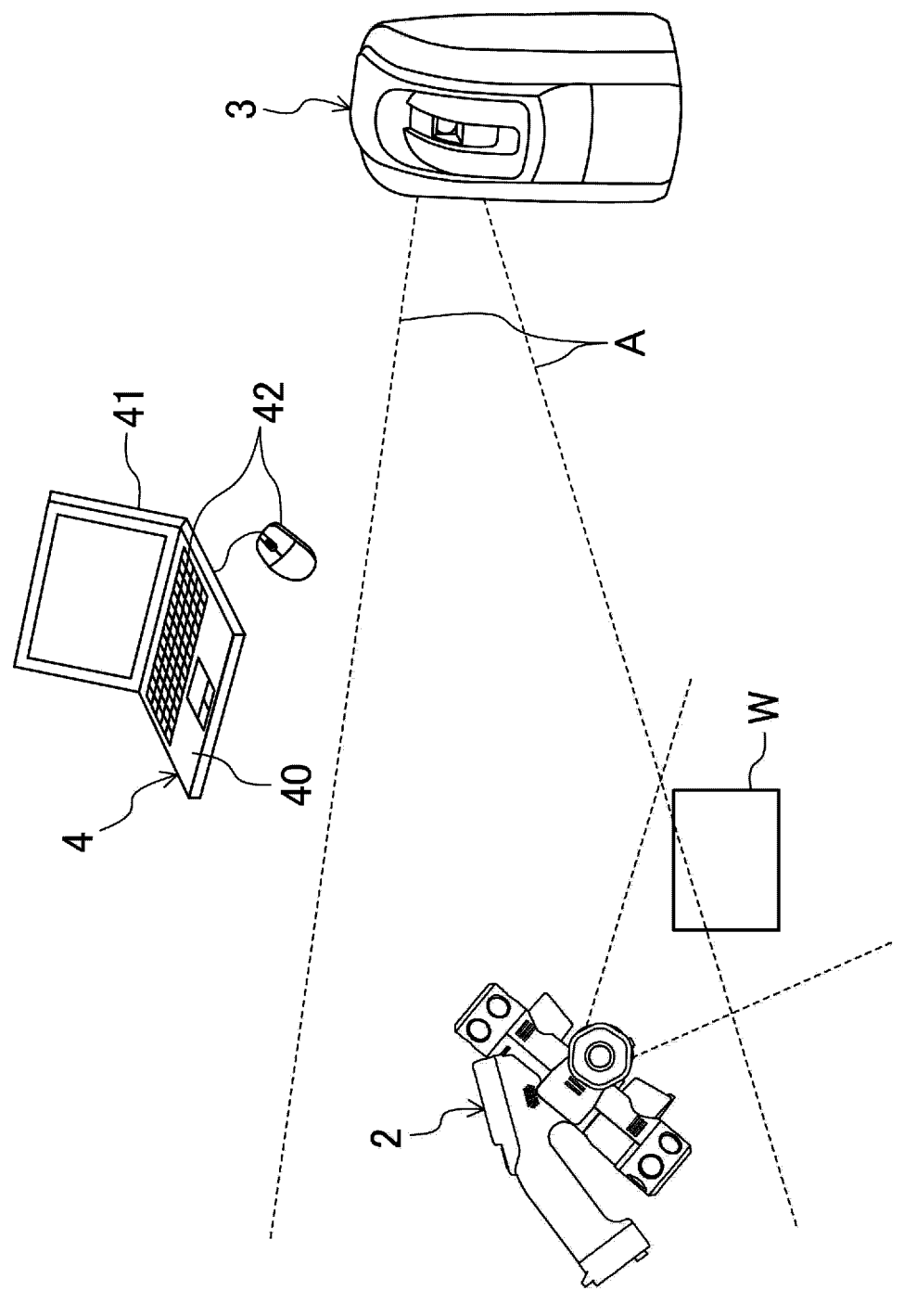
FIG. 1 is a view illustrating a configuration of a three-dimensional scanner according to an embodiment of the invention.

FIG. 1 is a view illustrating a configuration of a three-dimensional scanner 1 according to an embodiment of the invention. The three-dimensional scanner 1 is a shape measuring instrument that measures a three-dimensional shape and three-dimensional coordinates of a measurement target W without coming into contact with the measurement target W, and includes a probe 2 having a plurality of self-luminous markers, an imaging unit 3 that captures images of the plurality of self-luminous markers provided in the probe 2; a processing unit 4 that measures a three-dimensional shape and three-dimensional coordinates of the measurement target W based on a marker image generated by the imaging unit 3 and a bright line image generated by the probe 2. The probe 2 is provided separately from the imaging unit 3 and the processing unit 4, and a measurement worker can bring the probe 2 to the vicinity of the measurement target W located at a place distant from the imaging unit 3 and the processing unit 4 and cause the probe 2 to generate the bright line image.

Configuration of Imaging Unit 3

Figure 2:
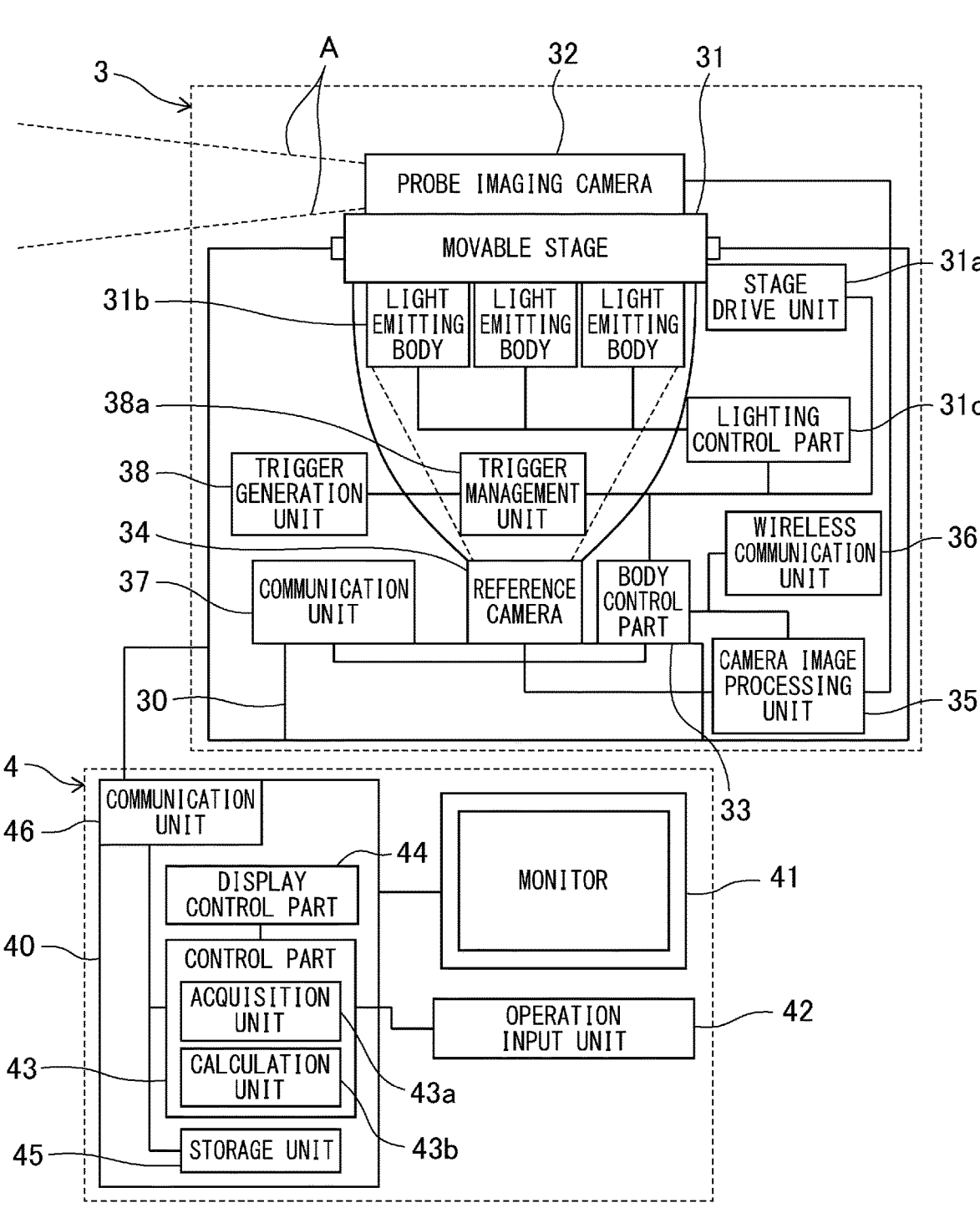
FIG. 2 is a block diagram of an imaging unit and a processing unit.

The imaging unit 3 is a unit that captures images of a plurality of self-luminous markers (which will be described later) provided on the probe 2 to generate a marker image including the plurality of self-luminous markers. As illustrated in FIG. 2, the imaging unit 3 includes a base 30, a movable stage 31 supported by the base 30, and a probe imaging camera 32 fixed to an upper portion of the movable stage 31. The movable stage 31 includes a stage drive unit 31a. The stage drive unit 31a incorporates an actuator such as a motor, and is configured to rotate the movable stage 31 about a left-right axis as well as a vertical axis. The probe imaging camera 32 rotates about the vertical axis by rotating the movable stage 31 about the vertical axis, and the probe imaging camera 32 rotates about the left-right axis by rotating the movable stage 31 about the left-right axis. As a result, the self-luminous marker can be tracked by moving a field of view (schematically indicated by broken lines A in FIGS. 1 and 2) of the probe imaging camera 32 such that the probe 2, that is, the plurality of self-luminous markers provided in the probe 2, enter the field of view of the probe imaging camera 32. The stage drive unit 31a is controlled by a body control part 33 provided in the imaging unit 3.

In a lower portion of the movable stage 31, a plurality of light emitting bodies 31b are provided at predetermined intervals on a two-dimensional plane, and the light emitting bodies 31b are switched between a turned-on state and a turned-off state by a lighting control part 31c. The plurality of light emitting bodies 31b move as the probe imaging camera 32 and the movable stage 31 move. The lighting control part 31c is controlled by the body control part 33. On the other hand, the base 30 is provided with a reference camera 34 that captures an image of the light emitting body 31b turned on by the lighting control part 31c.

The plurality of light emitting bodies 31b constitute reference markers of which images are captured by the reference camera 34. Specifically describing a configuration of a reference member including the plurality of light emitting bodies 31b, the reference member includes a light emitting substrate, a diffusion plate, and a glass plate arranged in order from the top to the bottom, and a periphery of a side of each of these is surrounded by a diffusion reflection sheet although not illustrated. On a lower surface of the light emitting substrate, a large number of the light emitting bodies 31b are mounted in an aligned state over the entire surface. Each of the light emitting bodies 31b is configured by, for example, an infrared light emitting diode (LED). As the light emitting bodies 31b, an LED that emits light of another wavelength may be used instead of the infrared LED, or other light emitting bodies such as a filament may be used. The light emitting bodies 31b are driven by the lighting control part 31c. The diffusion plate is, for example, a plate member made of resin, and transmits light generated from the plurality of light emitting bodies 31b downward while diffusing the light. The diffusion reflection sheet is, for example, a strip-shaped sheet member made of resin, and reflects the light, directed from the plurality of light emitting bodies 31b toward the side (outside) of the reference member, inward while diffusing the light. With the above configuration, the light emitted from the diffusion plate can be made uniform over the entire surface. The glass plate is plate glass, and is made of, for example, quartz glass or soda glass. Out of upper and lower surfaces of the glass plate, at least the lower surface is configured by a highly smoothed surface, and a thin film mask having a plurality of circular openings is provided on the lower surface. The thin film mask is, for example, a chromium mask formed on the lower surface of the glass plate by a sputtering method or a vapor deposition method. Each of the circular openings of this thin film mask defines a circular contour of the reference marker. As a result, it is possible to obtain an image having a prescribed shape without distortion regardless of an angle from which an image of the reference marker is captured. The reference marker that is a surface-emitting marker has any contour shape, and may be a quadrangle, a star, an ellipse, or the like.

With the above configuration, light is generated from the plurality of light emitting bodies 31b, diffused by the diffusion plate and the diffusion reflection sheet, and uniformly emitted over the entire surface. That is, a surface light source that uniformly emits light to the entire surface is obtained. Then, the light emitted from the surface light source is emitted below the reference member through each of the circular openings of the thin film mask. As a result, the surface-emitting reference marker having a clear contour is obtained. A plurality of the reference markers are arranged at equal intervals in a matrix on a lower surface (plane) of the reference member.

The imaging unit 3 is provided with a camera image processing unit 35. The camera image processing unit 35 includes an image processing circuit, and controls the probe imaging camera 32 to execute imaging at a predetermined timing. Examples of the image processing circuit include a graphics processing unit (GPU), a field programmable gate array (FPGA), a digital signal processor (DSP), and the like.

The camera image processing unit 35 receives an input of the marker image captured by the probe imaging camera 32 and an input of images of the light emitting bodies 31b captured by the reference camera 34.

The camera image processing unit 35 processes the marker image captured by the probe imaging camera 32 to generate center position information of a self-luminous marker, for example, a center position of a circular self-luminous marker. Specifically, the camera image processing unit 35 performs processing of extracting the center of the self-luminous marker with respect to the marker image. Then, the center position information of the self-luminous marker is generated based on an extracted result. Furthermore, the camera image processing unit 35 generates position and posture information of the self-luminous marker with respect to a movable imaging part 3A based on the center position information of the self-luminous marker obtained as a result of the processing of extracting the center of the self-luminous marker.

Pieces of center position information of self-luminous markers 71 to 77, 81 to 87, 91 to 97, and 101 to 107 are generated by the following method. First, the camera image processing unit 35 acquires arrangement information of each of the self-luminous markers 71 to 77, 81 to 87, 91 to 97, and 101 to 107 stored in the probe 2. Then, the camera image processing unit 35 calculates any position at which an image of each of the markers is captured by the imaging unit 3 when a relative position or posture of the probe 2 with respect to the imaging unit 3 is changed based on the arrangement information of the self-luminous markers 71 to 77, 81 to 87, 91 to 97, and 101 to 107 acquired from the probe 2 and relative three-dimensional position information between the markers included in the marker image generated by the camera image processing unit 35, and matches the calculated position of each of the markers with a marker position of an image 102. Then, a relative position and posture of the probe 2 with respect to the imaging unit 3 in which an error between the calculated position of each of the markers and the marker position of the image 102 is minimized are calculated and generated as the center position information of each of the self-luminous markers 71 to 77, 81 to 87, 91 to 97, and 101 to 107. That is, the camera image processing unit 35 virtually changes the arrangement information of each of the self-luminous markers 71 to 77, 81 to 87, 91 to 97, and 101 to 107 acquired from the probe 2 by virtually changing the position and posture of the probe 2, calculates a position and a posture matching the marker image generated by the camera image processing unit 35, and generates the center position information of each of the self-luminous markers 71 to 77, 81 to 87, 91 to 97, and 101 to 107. This position and posture information calculation processing may be called bundle adjustment. Here, for the matching, some of the self-luminous markers 71 to 77, 81 to 87, 91 to 97, and 101 to 107 included in the marker image may be selectively used representative markers. The circular self-luminous markers 71 to 77, 81 to 87, 91 to 97, and 101 to 107 have an elliptical shape depending on the position and posture of the probe 2. In this regard, as an example, an oblateness that is a ratio of lengths of a long side and a short side of each of the self-luminous markers 71 to 77, 81 to 87, 91 to 97, and 101 to 107 included in the marker image may be used to set the self-luminous markers 71 to 77, 81 to 87, 91 to 97, and 101 to 107 having the oblateness equal to or more than the predetermined value as representative markers while excluding a case where the oblateness is equal to or less than a predetermined value from calculation targets. Further, one close to a perfect circle in a marker block may be selected as a representative marker. As the self-luminous marker set as the calculation target is limited to the representative marker in this manner, it is possible to improve calculation speed and to suppress a decrease in measurement accuracy.

The center position information of each of the self-luminous markers 71 to 77, 81 to 87, 91 to 97, and 101 to 107 calculated here uses the probe imaging camera 32 as a reference. In this regard, the camera image processing unit 35 calculates position and posture information of the probe 2 using the reference camera 34 as a reference based on position and posture information of the probe imaging camera 32 using the reference camera 34 as a reference and the position and posture information of the probe 2 using the probe imaging camera 32 as a reference, thereby generating the center position information of the self-luminous marker using the reference camera 34 as a reference.

The imaging unit 3 includes a wireless communication unit 36 that is controlled by the body control part 33. The wireless communication unit 36 is a communication module or the like configured to be capable of communicating with equipment other than the imaging unit 3. In this example, the imaging unit 3 communicates with the probe 2 via the wireless communication unit 36, thereby enabling, for example, transmission and reception of various types of data such as image data captured by the probe imaging camera 32, various signals, and the like.

The imaging unit 3 also includes a communication unit 37 that is controlled by the body control part 33. The communication unit 37 is a communication module or the like configured to be capable of communicating with the processing unit 4. The imaging unit 3 communicates with the processing unit 4 via the communication unit 37, thereby enabling, for example, transmission and reception of various types of data such as image data and various signals. The communication by the communication unit 37 may be wired communication or wireless communication.

The imaging unit 3 includes a trigger generation unit 38 that generates a trigger signal that defines a synchronous execution timing based on a measurement instruction. The probe imaging camera 32, the reference camera 34, and the light emitting bodies 31*b* of the imaging unit 3 are synchronously controlled by the trigger signal generated by the trigger generation unit 38. Further, the trigger signal generated by the trigger generation unit 38 is transmitted to a trigger management unit 38*a*. The trigger management unit 38*a* generates identification information for identifying the trigger signal in response to reception of the trigger signal.

The trigger management unit 38*a* includes, for example, a ring buffer or a counter, and manages the generated identification information by the ring buffer or the counter. The trigger management unit 38*a* refers to the ring buffer or the counter in response to the reception of the trigger signal, and generates information obtained by performing a predetermined operation on information corresponding to the next buffer area or a value held in the counter as the identification information corresponding to the received trigger signal. Since the identification information uniquely identifies the trigger signal generated by the trigger generation unit 38, the identification information can also be referred to as a trigger ID. For example, when the measurement worker performs a predetermined measurement start operation, the body control part 33 of the imaging unit 3 receives the measurement start operation. When receiving the measurement start operation, the body control part 33 causes the trigger generation unit 38 to generate the trigger signal. The trigger is transmitted to the probe 2 via, for example, the wireless communication unit 36 or a communication cable connected to a connector CON.

In synchronization with the generation of the trigger signal by the trigger generation unit 38, the body control part 33 synchronously executes imaging of the self-luminous markers of the probe 2 by the probe imaging camera 32, lighting of the light emitting bodies 31*b* of the movable stage 31, and imaging of the light emitting bodies 31*b* by the reference camera 34. Further, the trigger signal is transmitted to the probe 2 via the wireless communication unit 36 or the communication cable such that the self-luminous markers of the probe 2 also emit light in synchronization with the generation of the trigger. Note that the light emitting bodies 31*b* of the movable stage 31 may be constantly turned on, and thus, control is performed such that at least light emission of the self-luminous markers of the probe 2, imaging by the probe imaging camera 32, and imaging by the reference camera 34 are executed in synchronization based on the trigger signal. Note that a timing of the light emission of the self-luminous markers of the probe 2 may be slightly earlier than a timing of the imaging by the probe imaging camera 32. In this case as well, it is assumed that the light emission of the self-luminous markers of the probe 2 is synchronized with the imaging by the probe imaging camera 32.

The communication unit 37 transmits center position information of a self-luminous marker generated by the camera image processing unit 35 to identification information corresponding to the center position information of the self-luminous marker to be tied to each other. Here, the identification information corresponding to the center position information of the self-luminous marker is also identification information corresponding to a marker image processed by the camera image processing unit 35 to generate the center position information of the self-luminous marker, and is identification information corresponding to a trigger signal for acquiring the marker image. Note that the term "tying" means linking or associating two or more pieces of information. In this case, the center position information of the self-luminous marker is linked to the identification information for distinguishing the center position information of the self-luminous marker from center position information of another self-luminous marker. Thus, center position information of a desired self-luminous marker can be specified based on the identification information. Note that the case where the trigger management unit 38*a* generates the identification information based on the trigger signal generated by the trigger generation unit 38 has been described here, but the invention is not limited to this method. The trigger generation unit 38 may generate not only the trigger signal but also the identification information corresponding to the trigger signal. In this case, not only the trigger signal but also the identification information may be transmitted to the probe 2 in a superimposed manner, so that it is possible to simplify processing of the probe 2 and to suppress the possibility that the identification information does not match between the imaging unit 3 and the probe 2.

Configuration of Processing Unit 4

The processing unit 4 is a part that receives positions and postures of a plurality of markers obtained by processing a marker image generated by the imaging unit 3 from the imaging unit 3, receives edge data of a bright line image obtained by processing the bright line image generated by the probe 2, and measures a three-dimensional shape of the measurement target W based on the received positions and postures of the markers and the edge data.

As a technique for measuring the three-dimensional shape, a conventionally known technique can be used. Hereinafter, an example will be described. Since the plurality of light emitting bodies 31*b* of the imaging unit 3 are provided on the movable stage 31 to which the probe 2 imaging camera 32 is fixed, a positional relationship of the plurality of light emitting bodies 31*b* with respect to the probe imaging camera 32 is known. When the probe imaging camera 32 is moved by the stage drive unit 31*a*, the probe imaging camera 32 moves within a range in which images of the light emitting bodies 31*b* can be captured by the reference camera 34. A position and a posture of the probe 2 with respect to the probe imaging camera 32 are determined based on a marker image of the probe 2 captured by the probe imaging camera 32, the reference camera 34 similarly determines a position and a posture of the probe imaging camera 32 with respect to the reference camera 34 based on the image obtained by imaging of the plurality of light emitting bodies 31*b*, and a position and a posture of the probe 2 with respect to the reference camera 34 are determined from these two positions and postures to obtain coordinates of a measurement point, whereby three-dimensional coordinate measurement, that is, three-dimensional shape measurement becomes possible.

FIG. 1 illustrates an example in which the processing unit 4 is configured by a general-purpose notebook personal computer. However, the processing unit 4 may be configured by a desktop personal computer, a controller dedicated to the three-dimensional scanner 1, or the like. In any case, the processing unit 4 can be used by installing a program or an application for implementing functions of the three-dimensional scanner 1. The processing unit 4 may be provided separately from the imaging unit 3 or may be integrated with the imaging unit 3. Further, a part of the processing unit 4 may be incorporated in the imaging unit 3, or a part of the imaging unit 3 may be incorporated in the processing unit 4.

As illustrated in FIG. 2, the processing unit 4 includes a control unit 40, a monitor 41, and an operation input unit 42. The monitor 41 is configured by a liquid crystal display, an organic EL display, or the like configured to be capable of displaying various images, a user interface, and the like.

The operation input unit 42 is a part by which a user performs various input operations. The operation input unit 42 includes, for example, a keyboard, a mouse, and the like.

The control unit 40 includes a control part 43, a display control part 44, a storage unit 45, and a communication unit 46. The display control part 44 is a part that controls the monitor 41 based on a signal output from the control part 43, and causes the monitor 41 to display various images, a user interface, and the like. The user's operation performed on the user interface is acquired by the control part 43 based on a signal output from the operation input unit 42.

The storage unit 45 may be a ROM, a solid state drive, a hard disk drive, or the like. The storage unit 45 stores arrangement information of each of self-luminous markers in marker blocks provided in the probe 2. The arrangement information of the marker block and each of the self-luminous markers includes a distance between the marker blocks, information indicating a relative positional relationship of the self-luminous markers provided in each of the marker blocks, and the like.

The control part 43 includes an acquisition unit 43*a* and a calculation unit 43*b*. The acquisition unit 43*a* and the calculation unit 43*b* operate as follows. That is, the acquisition unit 43*a* is a part that acquires misalignment information between a plurality of the marker blocks caused by a temperature change of a scanner unit (which will be described later) provided in the probe 2 based on the arrangement information of the self-luminous markers stored in the storage unit 45. For example, a dimensional change of a member when an environmental temperature is changed can be measured or calculated in advance, and a relationship between the environmental temperature and an amount of the dimensional change of the member can be held in a predetermined format and used as the misalignment information between the marker blocks. Details will be described in temperature correction processing to be described later.

Further, the calculation unit 43*b* calculates three-dimensional coordinates of the measurement target W based on the bright line image generated by the probe 2, positions and postures of the plurality of markers included in the marker image generated by the imaging unit 3, and the misalignment information acquired by the acquisition unit 43*a*. For example, the amount of the dimensional change of the member can be acquired based on the misalignment information by providing a temperature sensor to detect the temperature in the vicinity of the member constituting the probe 2. The accuracy of a calculation result can be enhanced by adding the acquired amount of the dimensional change to the calculation of the three-dimensional coordinates of the measurement target W.

Further, the communication unit 46 of the processing unit 4 is controlled by the control part 43. The communication unit 46 is a communication module or the like configured to be capable of communicating with the communication unit 37 of the imaging unit 3.

Configuration of Probe 2

The probe 2 is configured such that the measurement worker can measure the shape of the measurement target W while holding and freely moving the probe 2 with one hand or both hands, and is a handheld and portable non-contact probe. Power may be supplied from the outside, or supplied from a built-in battery. In the present embodiment, the front, rear, left, right, up, down of the probe 2 are defined as illustrated in FIGS. 3 to 7. That is, when the measurement worker holds the probe 2 by hand, a side located on the right is referred to as the right, and a side located on the left is referred to as the left. The front of the probe 2 is a side opposing the measurement target W, and the rear side of the probe 2 is a side opposite to the side opposing the measurement target W. The up of the probe 2 is a side on the upper side in a state where a grip part 112, which will be described later, is gripped in a natural posture as determined, and the down of the probe 2 is a side on the lower side in a state where the grip part 112 is gripped in the natural posture as determined. However, since the three-dimensional shape of the measurement target W can be measured while the probe 2 is held and moved by hand as described above, the probe 2 may have an orientation of being inverted upside down or a posture in which the upper side is located on the right or left, or the rear side thereof may be located at the up or down.

Figure 4:
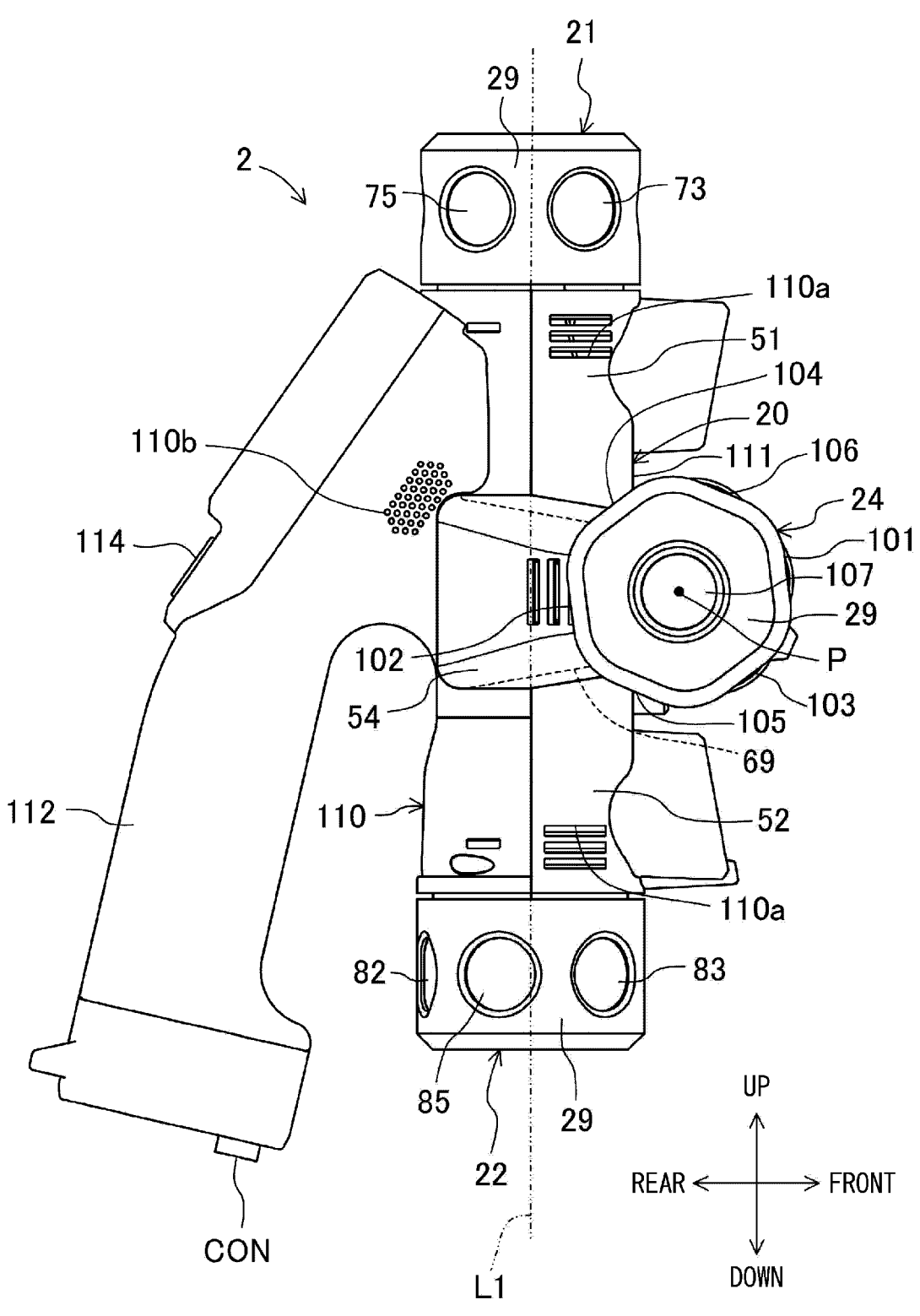
FIG. 4 is a right side view of the probe.

The probe 2 includes a probe body 20, a first marker block 21, a second marker block 22, a third marker block 23, and a fourth marker block 24. Although details will be described later, the first to fourth marker blocks 21 to 24 each have self-luminous markers facing a plurality of directions, respectively. In a front view illustrated in FIG. 7, a dimension in an up-down direction of the probe body 20 is set to be longer than a dimension in a left-right direction, and accordingly, a longitudinal direction of the probe body 20 is the up-down direction and a lateral direction is the left-right direction. Note that the longitudinal direction may be the left-right direction, or the dimension in the up-down direction and the dimension in the left-right direction may be the same. Further, an origin of the probe 2 may be determined based on a positional relationship of the first to fourth marker blocks 21 to 24. That is, a straight line L1 (illustrated in FIG. 4) connecting the first marker block 21 and the second marker block 22 and a straight line L2 (illustrated in FIG. 6) connecting the third marker block 23 and the fourth marker block 24 are virtually defined. Since these two straight lines L1 and L2 are in a twisted relationship and do not intersect, a virtual intersection point is defined by projecting one straight line onto the other straight line. A perpendicular line may be drawn from the virtual intersection point defined in this manner to the one straight line, and a midpoint between a point where the perpendicular line intersects with the one straight line and the virtual intersection point may be defined as an origin P. In this manner, a point at which distances from the first to fourth marker blocks 21 to 24 are equal may be defined as the origin P (illustrated in FIGS. 4 and 6). When the origin P is defined in this manner, calculation processing at the time of calculating three-dimensional coordinates to be described later can be alleviated. The origin P illustrated in FIG. 4 is originally located at a midpoint between the third marker block 23 and the fourth marker block 24, but the origin P is located in front of the fourth marker block 24 for convenience illustrated in FIG. 4.

The probe body 20 includes a first arm part 51 extending upward from a central portion, a second arm part 52 extending downward from the central portion, a third arm part 53 extending leftward from the central portion, and a fourth arm part 54 extending rightward from the central portion. A center line extending in the longitudinal direction (up-down direction) of the first arm part 51 and a center line extending in the longitudinal direction (up-down direction) of the second arm part 52 are arranged on the same straight line B. Further, a center line extending in the longitudinal direction (left-right direction) of the third arm part 53 and a center line (left-right direction) extending in the longitudinal direction of the fourth arm part 54 are arranged on the same straight line C. The straight line B extending in the up-down direction and the straight line C extending in the left-right direction are orthogonal to each other in the front view.

The first marker block 21 is attached to a distal end of the first arm part 51, the second marker block 22 is attached to a distal end of the second arm part 52, the third marker block 23 is attached to a distal end of the third arm part 53, and the fourth marker block 24 is attached to a distal end of the fourth arm part 54.

Figure 8:
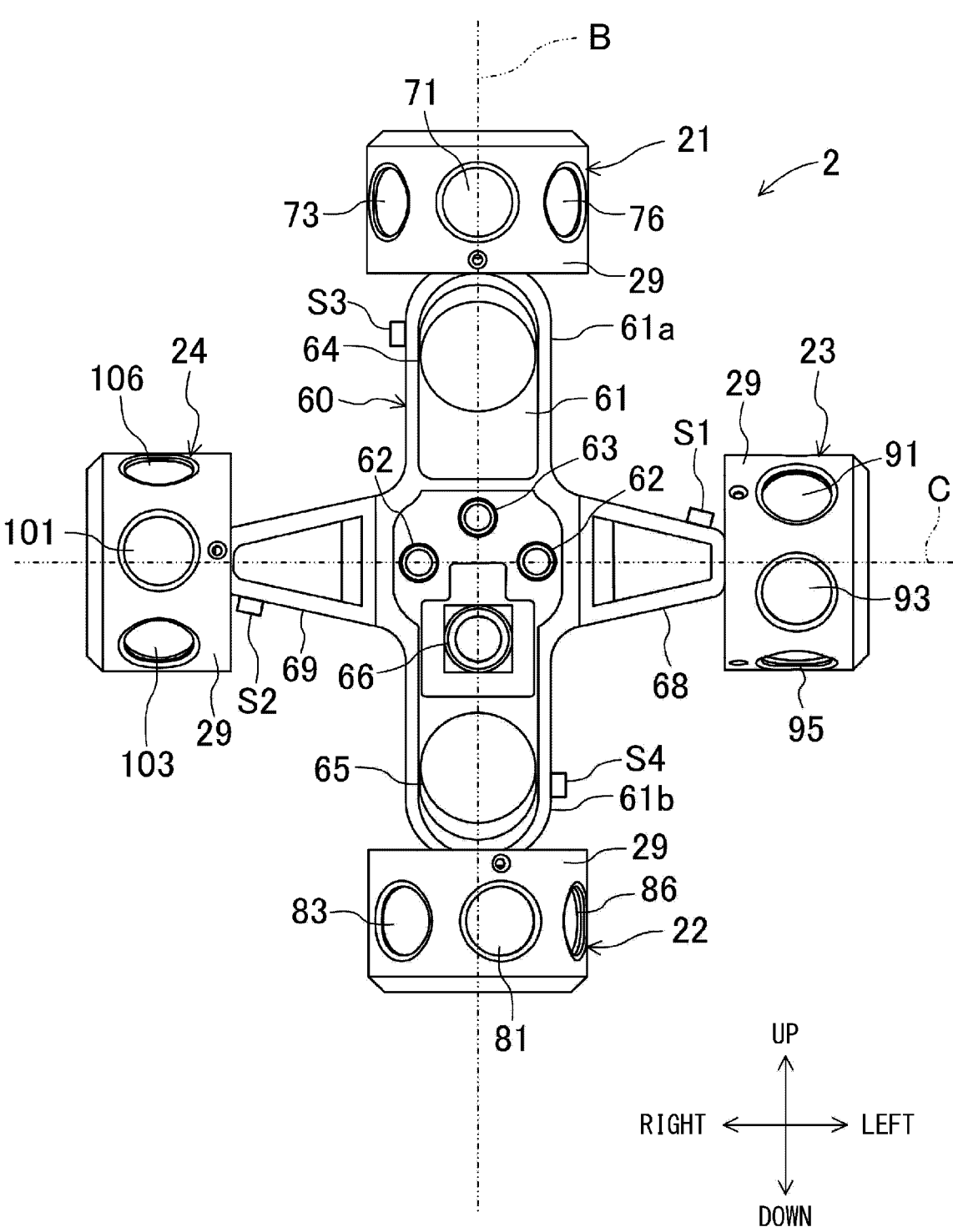
FIG. 8 is a front view of the probe illustrating a state where an exterior member is detached.

As illustrated in FIG. 8, the probe body 20 includes a scanner unit 60 and an optical base 61. The first to fourth marker blocks 21 to 24 are arranged around the scanner unit 60. The scanner unit 60 includes first scanner light sources 62, a second scanner light source 63, a first scanner imaging part 64, a second scanner imaging part 65, and a texture camera 66. The optical base 61 is a member made of a light alloy such as an aluminum alloy or a magnesium alloy, for example, and is arranged at the central portion of the probe body 20 in the left-right direction and has a shape elongated in the up-down direction. A part on the upper side of a central portion of the optical base 61 is a part constituting the first arm part 51, and is an upper support part 61*a* that supports the first marker block 21. Thus, the first marker block 21 is attached to an upper end of the upper support part 61*a*. A part on the lower side of the central portion of the optical base 61 is a part constituting the second arm part 52, and is a lower support part 61*b* that supports the second marker block 22. Thus, the second marker block 22 is attached to a lower end of the lower support part 61*b*.

Two first scanner light sources 62 are attached to the central portion of the optical base 61 in the up-down direction, that is, the part between upper support part 61*a* and lower support part 61*b* at an interval in the left-right direction. The two first scanner light sources 62 are multi-line light sources each emitting a plurality of linear light beams in a measurement direction (forward), and are arranged such that light emission surfaces oppose the measurement target W at the time of measurement. The light emitted by the first scanner light source 62 can be referred to as multi-line light, and the multi-line light is included in pattern light.

The second scanner light source 63 is attached above the first scanner light source 62 in the central portion of the optical base 61 in the up-down direction. The second scanner light source 63 is a single-line light source that emits one linear light beam in the measurement direction (forward), and is arranged such that a light emission surface opposes the measurement target W at the time of measurement. The light emitted by the second scanner light source 63 can be referred to as single-line light, and the single-line light is also included in the pattern light.

The multi-line light emitted from the first scanner light source 62 is generated by dividing laser light emitted from one laser light source into a plurality of beams by a beam splitter. Therefore, a light amount of each beam of the multi-line light emitted from the first scanner light source 62 relatively decreases as compared with a light amount of the light generated by the laser light source. On the other hand, the single-line light emitted from the second scanner light source 63, which is the single-line light source, is generated without dividing laser light emitted by one laser light source. Therefore, a light amount of the single-line light emitted from the second scanner light source 63 is less likely to decrease from the light amount of the light generated by the laser light source. When the light amount is compared between the multi-line light emitted from the first scanner light source 62 and the single-line light emitted from the second scanner light source 63, the light amount of the single-line light emitted from the second scanner light source 63 is relatively larger. Therefore, measurement data can also be acquired from the measurement target W having a small light reflectance, and the capability to cope with a workpiece can be improved.

Each of the first scanner light sources 62 and the second scanner light source 63 includes the laser light source that emits the laser light, but a type of the light source is not particularly limited. Further, a total of three scanner light sources 62 and 63 are provided in this example, but the invention is not limited thereto, and one or more scanner light sources may be provided. Further, a type of the pattern light is not particularly limited, and the scanner light source may emit pattern light other than the multi-line light and the single-line light.

The first scanner imaging part 64 and the second scanner imaging part 65 include, for example, a light receiving element such as a CMOS sensor, an optical system for forming an image of light incident from the outside on a light receiving surface of the light receiving element, and the like. The first scanner imaging part 64 is attached to an upper portion of the optical base 61 which is a portion spaced upward from the scanner light sources 62 and 63. The second scanner imaging part 65 is attached to a lower portion of the optical base 61 which is a portion spaced downward from the scanner light sources 62 and 63. The first scanner imaging part 64 and the second scanner imaging part 65 are arranged such that optical axes thereof are oriented in irradiation directions of beams of the pattern light from the scanner light sources 62 and 63, respectively, and accordingly, it is possible to capture images of beams of the pattern light emitted from the scanner light sources 62 and 63 in the measurement direction and generate bright line images, respectively.

Since the first scanner imaging part 64 is attached to the upper portion of the optical base 61 and the second scanner imaging part 65 is attached to the lower portion of the optical base 61, it is possible to secure a long distance between the first scanner imaging part 64 and the second scanner imaging part 65 and to enhance accuracy of a stereo measurement method. That is, a distance between the optical axes of the first scanner imaging part 64 and the second scanner imaging part 65 is known, a corresponding point between the respective images generated by simultaneously capturing the pattern light emitted from the first scanner light source 62 or the second scanner light source 63 by the first scanner imaging part 64 and the second scanner imaging part 65 is obtained, and three-dimensional coordinates of the corresponding point can be obtained using the stereo measurement method. The stereo measurement method may be passive stereo using the first scanner imaging part 64 and the second scanner imaging part 65, or may be active stereo using one scanner imaging part. In particular, there is a case where the pattern light is not included in one of the images generated by the first scanner imaging part 64 and the second scanner imaging part 65, such as a case where the measurement target W is specularly reflected or a case where a deep hole is measured. In such a case, the three-dimensional coordinates may be calculated by an active stereo method based on a positional relationship between the scanner imaging part and the scanner light source corresponding to the image obtained by capturing the pattern light.

The texture camera 66 includes, for example, a light receiving element such as a CMOS sensor capable of acquiring a color image, an optical system for forming an image of light incident from the outside on a light receiving surface of the light receiving element, and the like. The texture camera 66 is attached to the optical base 61 between the first scanner imaging part 64 and the second scanner imaging part 65. The texture camera 66 is arranged such that an optical axis is oriented toward the measurement target W at the time of measurement, and captures an image of the measurement target W to generate a texture image.

The probe body 20 includes a left support part 68 that supports the third marker block 23 with respect to the scanner unit 60 and a right support part 69 that supports the fourth marker block 24 with respect to the scanner unit 60. The left support part 68 and the right support part 69 are members made of a light alloy, which is similar to the optical base 61. In this example, a case where the left support part 68 and the right support part 69 are provided separately from the optical base 61 is illustrated, but the invention is not limited thereto, and the left support part 68 and the right support part 69 may be molded integrally with the optical base 61.

Figure 5:
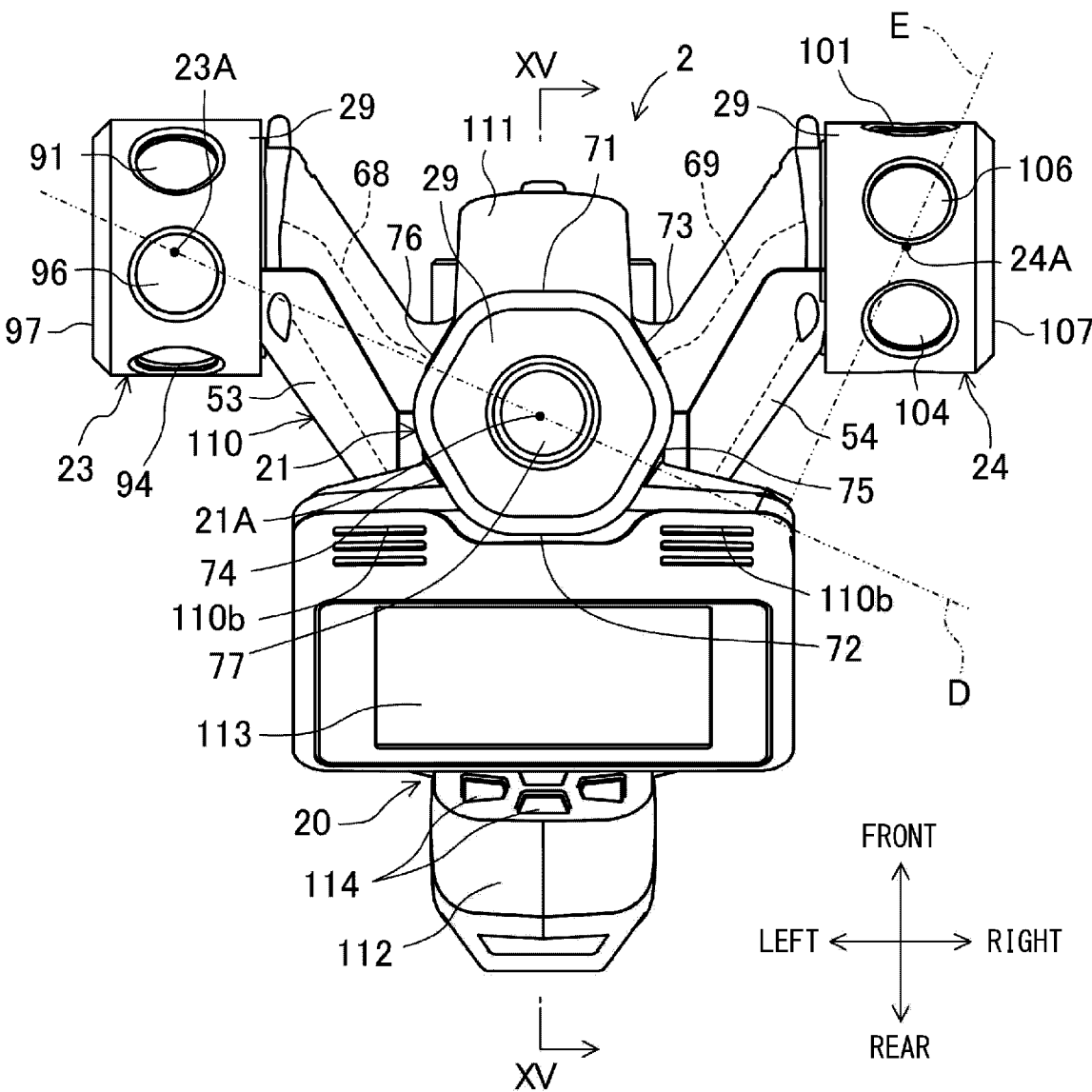
FIG. 5 is a plan view of the probe.

The left support part 68 is fixed to a left side surface of the central portion of the optical base 61 in the up-down direction by a fastening member or the like, and protrudes in the left direction and extends so as to be located forward as approaching a left end as indicated by broken lines in FIGS. 4 to 5. The third marker block 23 is attached to the left end of the left support part 68. Further, the right support part 69 is fixed to a right side surface of the central portion of the optical base 61 in the up-down direction by a fastening member or the like, and protrudes in the right direction and extends so as to be located forward as approaching a right end. The fourth marker block 24 is attached to the right end of the right support part 69.

With the above configuration, the first marker block 21 and the second marker block 22 are arranged to be spaced apart from each other in the up-down direction, and the scanner unit 60 is arranged at the central portion between the first marker block 21 and the second marker block 22. Therefore, the first marker block 21 and the second marker block 22 constitute a pair of marker blocks arrayed side by side in the up-down direction (a first direction) in a state where the scanner unit 60 is positioned at the center. Further, since the up-down direction of the probe body 20 is the longitudinal direction of the probe body 20, the pair of marker blocks including the first marker block 21 and the second marker block 22 is provided at both ends of the probe body 20 in the longitudinal direction.

Further, the third marker block 23 and the fourth marker block 24 are spaced apart from each other in the left-right direction, and the scanner unit 60 is arranged at the central portion between the third marker block 23 and the fourth marker block 24. Therefore, the third marker block 23 and the fourth marker block 24 constitute a pair of marker blocks arrayed side by side in the left-right direction (a second direction) in a state where the scanner unit 60 is positioned at the center.

Since the first direction and the second direction are orthogonal to each other in the front view, an array direction of the pair of marker blocks including the first marker block 21 and the second marker block 22 and an array direction of the pair of marker blocks including the third marker block 23 and the fourth marker block 24 are orthogonal to each other as viewed from the measurement direction.

Since the third marker block 23 and the fourth marker block 24 are attached to distal ends of the left support part 68 and the right support part 69 extending forward, respectively, the pair of marker blocks including the third marker block 23 and the fourth marker block 24 is provided at positions offset from the scanner unit 60 in the measurement direction (forward). The term "offset" refers to being positioned forward of the scanner unit 60 when the scanner unit 60 is used as a reference.

Further, at least one of temperature sensors S1 to S4 may be provided in optical base 61, the left support part 68, and the right support part 69 as illustrated in FIG. 8. As will be described later, the accuracy of the calculation result of the three-dimensional coordinates can be enhanced by providing the temperature sensors S1 to S4 and detecting temperatures in the vicinities of members constituting the probe 2. The temperature sensors S1 to S4 are arranged from the optical base 61, the left support part 68, and the right support part 69, respectively, toward the outer side of the probe 2. Since the space inside the optical base 61 is limited by the scanner imaging parts 64 and 65 and the scanner light sources 62 and 63, the temperature sensors S1 to S4 may be arranged toward the outer side of the probe 2. In this case, it is sufficient to attach the temperature sensors S1 to S4 toward the outer side of the probe 2, and thus, assembly can be easily performed. Further, the temperature sensors S1 to S4 may be arranged in point symmetry with respect to an intersection point between the straight line C and a straight line B' obtained by projecting the straight line B on the straight line C instead of being arranged symmetrically with respect to the straight line B or the straight line C. That is, one of the first temperature sensor S1 and the second temperature sensor S2 may be arranged on the right side with respect to the straight line B, and the other may be arranged on the left side with respect to the straight line B. Further, one of the third temperature sensor S3 and the fourth temperature sensor S4 may be arranged on the upper side with respect to the straight line C, and the other may be arranged on the lower side with respect to the straight line C. Since the plurality of temperature sensors S1 to S4 are arranged in point symmetry, the environmental temperature of the probe 2 can be measured more accurately.

Figure 6:
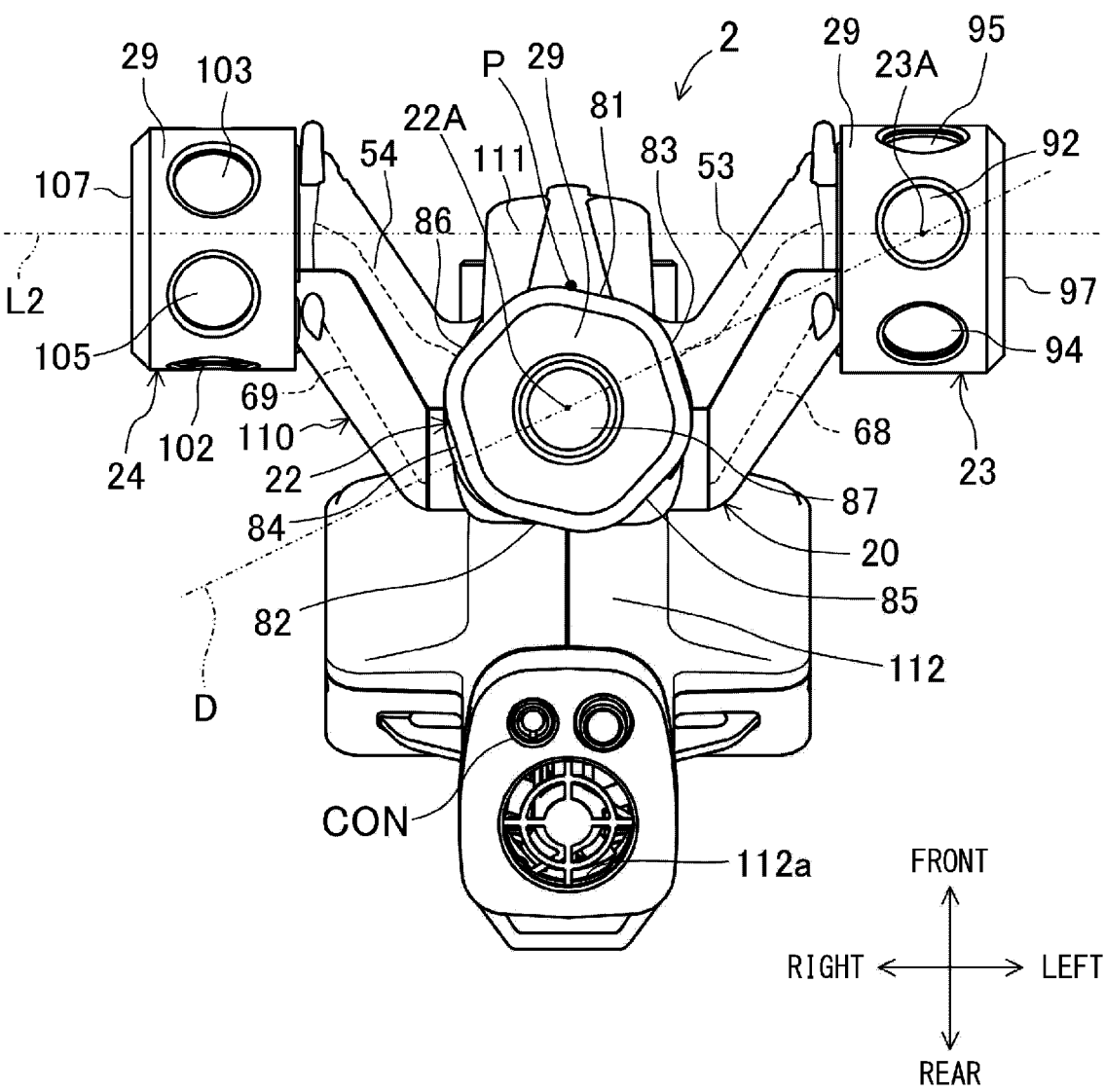
FIG. 6 is a bottom view of the probe.

As illustrated in FIGS. 5 and 6, a virtual plane D is defined by the first marker block 21, the second marker block 22, and the third marker block 23. When the virtual plane D is defined, a plane passing through a center of gravity 21A (illustrated in FIG. 5) of the first marker block 21, a center of gravity 22A (illustrated in FIG. 6) of the second marker block 22, and a center of gravity 23A (illustrated in FIGS. 5 and 6) of the third marker block 23 can be defined as the virtual plane D. Further, a plane passing through the center of the first marker block 21, the center of the second marker block 22, and the center of the third marker block 23 may be set as the virtual plane D.

The fourth marker block 24 is arranged so as to be separated from the virtual plane D. In this example, the fourth marker block 24 is supported by the right support part 69 extending so as to be located forward as approaching the right end, and thus, is arranged at a position separated forward from the virtual plane D. For example, when a virtual line E passing through a center of gravity 24A of the fourth marker block 24 and perpendicular to the virtual plane D is defined as illustrated in FIG. 5, a distance between the center of gravity 24A on the virtual line E and the virtual plane D can be set as a separation distance of the fourth marker block 24 from the virtual plane D. This separation distance can be set to any distance.

The first to fourth marker blocks 21 to 24 have the same structure. As illustrated in FIGS. 9 to 12, the first marker block 21 includes the first to seventh self-luminous markers 71 to 77 facing a plurality of directions, respectively, and a marker holder 78 that positions and fixes each of the first to seventh self-luminous markers 71 to 77. In FIGS. 3 to 8, the marker holder 78 is covered with a resin cover 29.

The marker holder 78 is made of a material having a thermal expansion coefficient lower than those of materials forming the optical base 61, the left-support part 68, and the right-support part 69. Examples of such a material include low-expansion ceramics such as quartz and cordierite, low-expansion metal such as invar, and carbon-fiber-reinforced plastic (CFRP). Among these, only one type may be used form the marker holder 78, or a plurality of arbitrary types may be combined to form the marker holder 78. In other words, the optical base 61, the left support part 68, and the right support part 69 are made of materials having a higher thermal expansion coefficient than the marker holder 78.

In this example, the marker holder 78 has a hollow column shape having a hexagonal cross-section, but the invention is not limited thereto, and may have a column shape having a polygonal cross-section of, for example, a triangle, a quadrangle, a pentagon, or a heptagon or a polygon with the number of vertices greater than seven. Further, the marker holder 78 may have a cylindrical shape. Hereinafter, a case where the marker holder 78 has a hexagonal or regular hexagonal column shape will be described. Note that the marker holder 78 is formed in a shape that can be approximated to a regular hexagonal column shape since it is an industrial product so that it is difficult to form a strictly regular hexagonal column shape.

Figure 9:
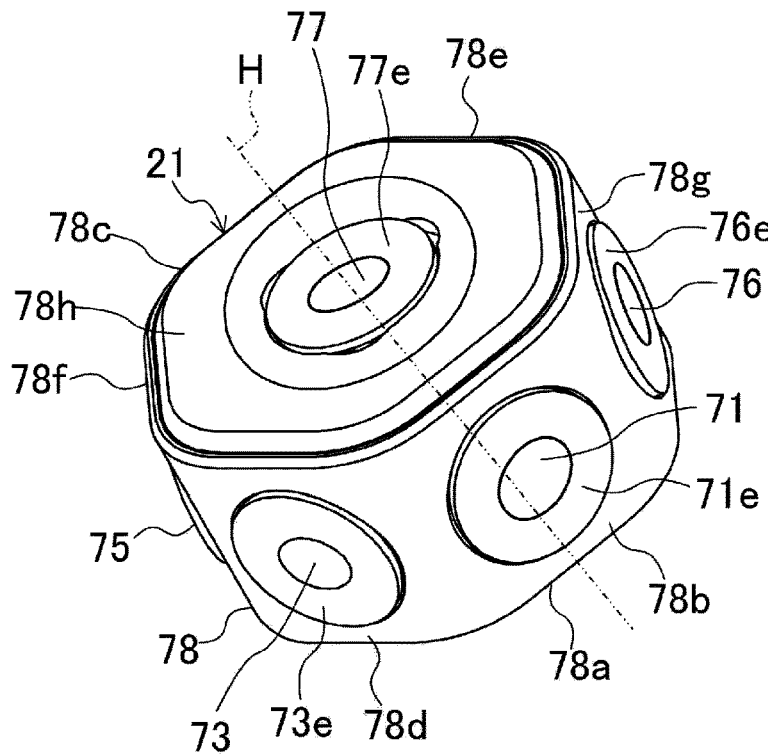
FIG. 9 is a perspective view of a first marker block.
Figure 11:
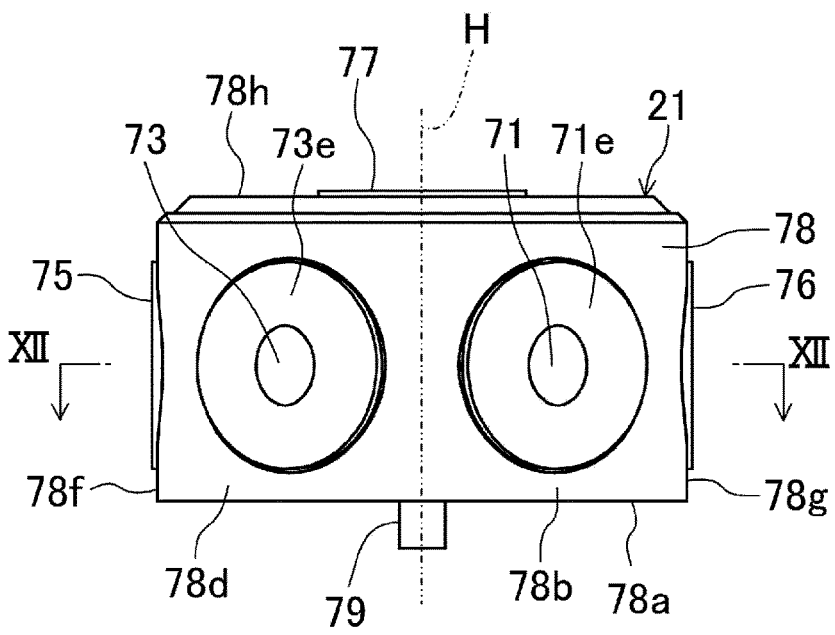
FIG. 11 is a side view of the first marker block.

When the marker holder 78 has a hexagonal column shape, as illustrated in FIGS. 9 and 11, an axis H of the marker holder 78 can be geometrically defined, and this axis H can also be referred to as an axis of the first marker block 21. The first marker block 21 is arranged such that the axis H is located on an extension line of the straight line B (illustrated in FIGS. 7 and 8).

As illustrated in FIG. 11, one end surface of the marker holder 78 in an axial direction is an attachment surface 78a to be attached to the upper support part 61a of the optical base 61. An attachment boss 79 protrudes from the attachment surface 78a in the axial direction. On the other hand, at least one self-luminous marker is provided on each surface other than the attachment surface 78a of the marker holder 78, and at least one self-luminous marker is also provided on the other end surface of the marker holder 78 in the axial direction.

Figure 10:
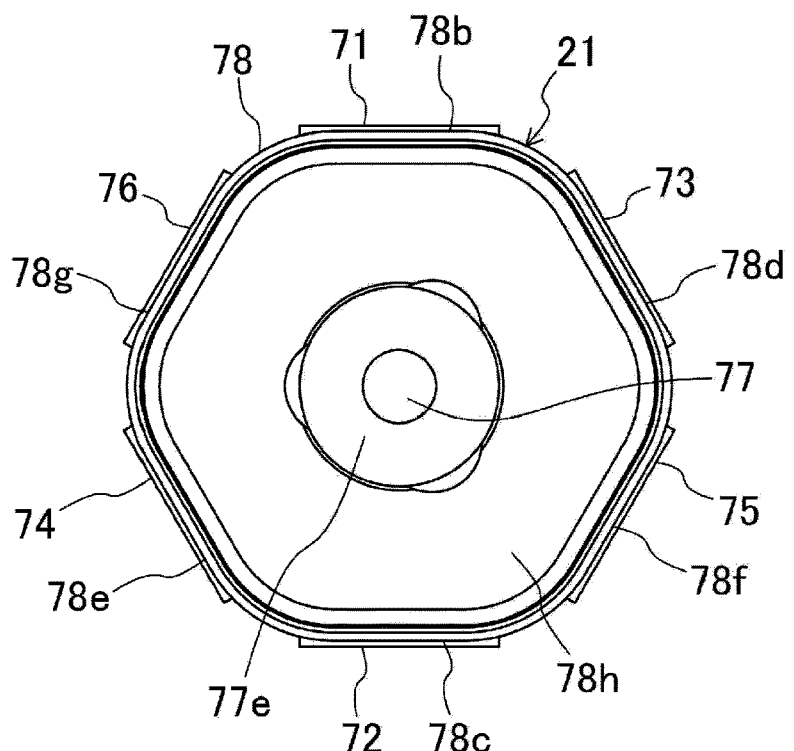
FIG. 10 is a plan view of the first marker block.
Figure 12:
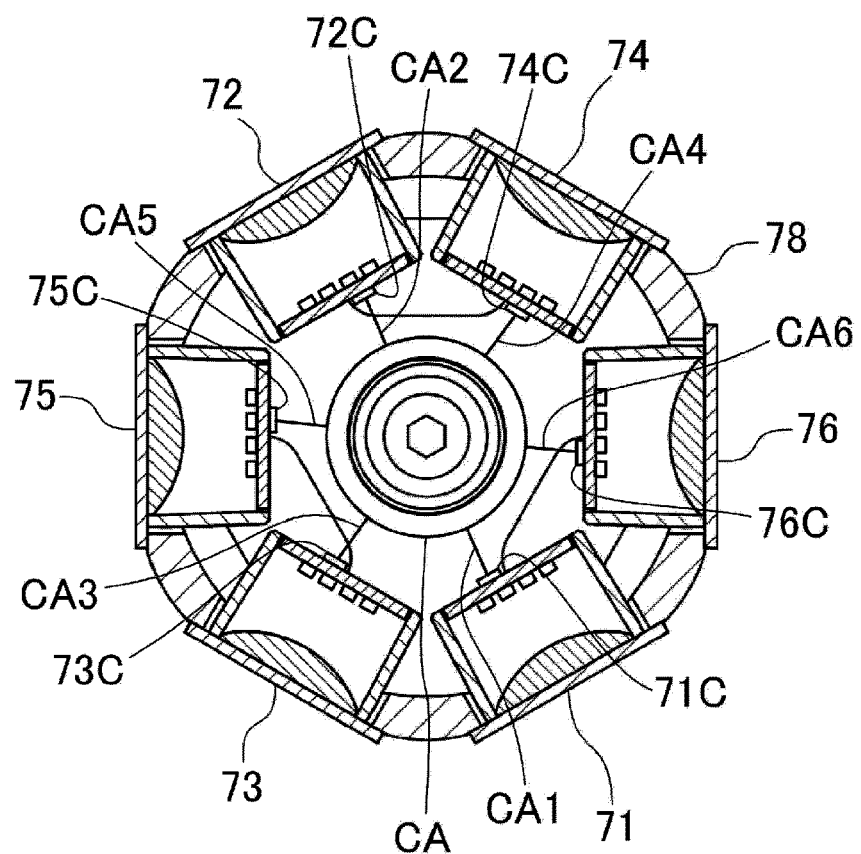
FIG. 12 is a cross-sectional view taken along line XII-XII in FIG. 11.

Specifically, the marker holder 78 has a regular hexagonal column shape as illustrated in FIG. 10, and thus, has a first surface 78b, a second surface 78c, a third surface 78d, a fourth surface 78e, a fifth surface 78f, and a sixth surface 78g formed as six planes on its outer peripheral surface. As illustrated in FIG. 12, the first to sixth self-luminous markers 71 to 76 are arranged on the first to sixth surfaces 78b to 78g, respectively.

Further, each of the first to sixth self-luminous markers 71 to 76 includes a transparent plate 71A made of glass, ceramics, or glass ceramics, and a thin film 71e formed on the plate 71A. The thin film 71e is formed by printing a light-shielding mask on one surface of the plate 71A. As the thin film 71e is formed on the plate 71A, an outer shape of each of the self-luminous markers 71 to 76 is formed. The plate 71A has high translucency. As a material of the plate 71A, for example, quartz glass or soda glass is used. In particular, quartz glass having a low linear expansion coefficient and low hygroscopicity is preferably used as the material of the plate 71A. As a material of the mask, a metal material having high adsorption (strong adhesion) to glass is used, and for example, chromium is used. As a result, the mask having high film strength and a small film thickness can be formed on a plate-shaped member made of glass. Further, a mask made of a laminated film having high film strength may be formed by further forming another metal thin film on a thin film made of a metal material which is easily adsorbed to glass. Further, the mask may be formed using an emulsion ink, other organic inks, or the like. A thickness of the thin film 71e is smaller than a thickness of the plate 71A. The thickness of the thin film 71e is preferably 5 μm or less, and more preferably 200 nm or less.

In FIGS. 9 to 11, the thin films of the self-luminous markers 71, 73, 76, and 77 are denoted by reference signs 71e, 73e, 76e, and 77e, respectively.

As illustrated in FIG. 10, in the outer peripheral surface of the marker holder 78, a surface farthest from the first surface 78b is the second surface 78c, and the first surface 78b and the second surface 78c are parallel to each other. Further, in the outer peripheral surface of the marker holder 78, a surface farthest from the third surface 78d is the fourth surface 78e, and the third surface 78d and the fourth surface 78e are parallel to each other. Furthermore, in the outer peripheral surface of the marker holder 78, a surface farthest from the fifth surface 78f is the sixth surface 78g, and the fifth surface 78f and the sixth surface 78g are parallel to each other. Further, the third to sixth surfaces 78d to 78g are in a positional relationship of intersecting with the first surface 78b and the second surface 78c. That is, in the marker holder 78, the third to sixth surfaces 78d to 78g are formed as a plurality of side surfaces intersecting with the first surface 78b and the second surface 78c. Since orientations of the first to sixth surfaces 78b to 78g are all different, orientations of the first to sixth self-luminous markers 71 to 76 are also all different. Further, the first to sixth self-luminous markers 71 to 76 are arranged at equal intervals about the axis H.

As illustrated in FIGS. 9 and 11, the other end surface 78h of the marker holder 78 in the axial direction is in a positional relationship of being orthogonal to the first to sixth surfaces 78b to 78g. The seventh self-luminous marker 77 is arranged on the other end surface 78h of the marker holder 78. An optical axis of the seventh self-luminous marker 77 is in a positional relationship of being orthogonal to the other end surface 78h, and thus, optical axes of the first to sixth self-luminous markers 71 to 76 and the optical axis of the seventh self-luminous marker 77 are orthogonal to each other. The seventh self-luminous marker 77 is positioned at a central portion (on the axis H) of the other end surface 78h of the marker holder 78.

Figure 13:
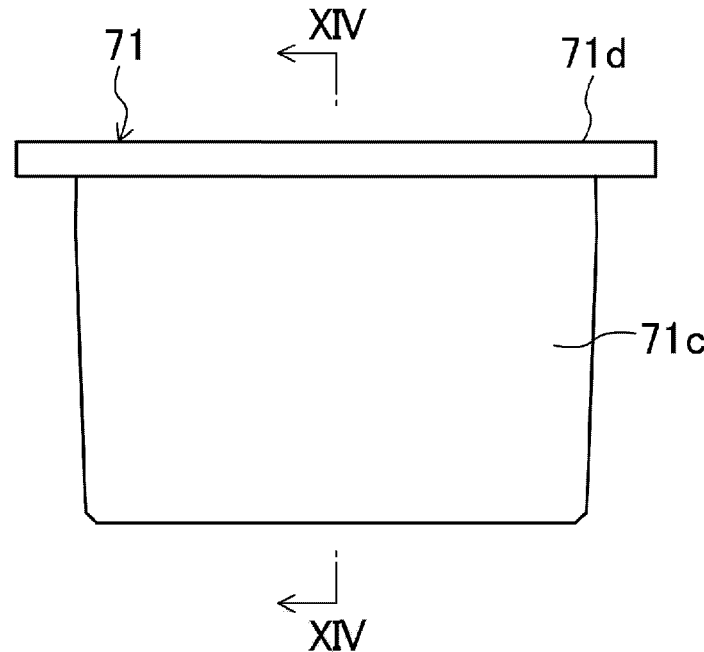
FIG. 13 is a side view of a first self-luminous marker.
Figure 14:
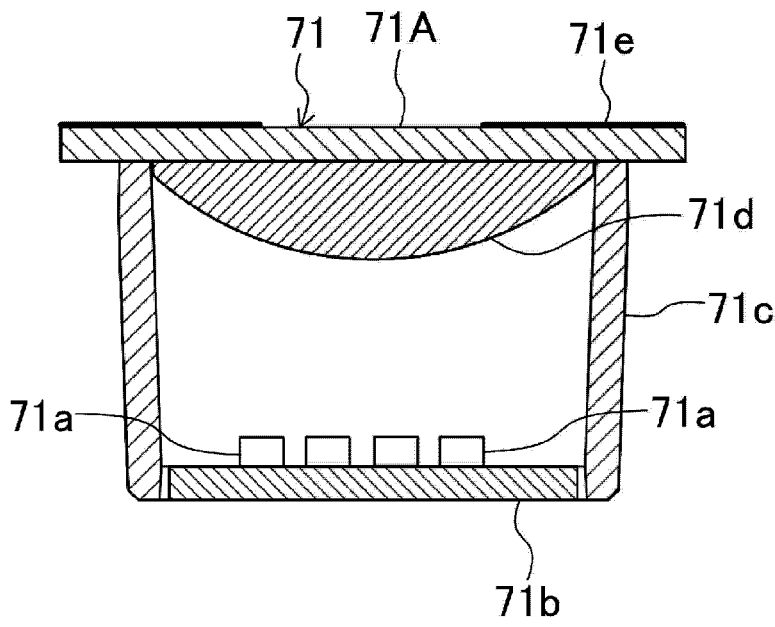
FIG. 14 is a cross-sectional view taken along line XIV-XIV in FIG. 13.

The first to seventh self-luminous markers 71 to 77 all have the same structure, and details of the first self-luminous marker 71 will be described hereinafter with reference to FIGS. 13 and 14. The first self-luminous marker 71 includes a light emitting diode (LED) 71a, a substrate 71b, a tubular member 71c, and a diffusion plate 71d. The light emitting diode 71a is a marker light source, and in this example, a plurality of the light emitting diodes 71a are mounted on the substrate 71b. The plurality of light emitting diodes 71a are arranged at intervals in a direction along a surface of the substrate 71b. The tubular member 71c is formed so as to surround the plurality of light emitting diodes 71a and beams of light emitted from the light emitting diodes 71a. An inner surface of the tubular member 71c is configured by a diffusion reflection plate that reflects and diffuses light.

The diffusion plate 71d is a member for diffusing beams of light emitted from the plurality of light emitting diodes 71a. As viewed along an optical axis direction of the first self-luminous marker 71, the diffusion plate 71d is formed to be larger than a region where the plurality of light emitting diodes 71a are arranged. In other words, a size of the diffusion plate 71d is set such that a light emitting surface having an area required as a marker is secured while achieving downsizing and weight reduction of the first self-luminous marker 71 by reducing the region where the plurality of light emitting diodes 71a are arranged.

Here, it is preferable that the entire light emitting surface of the first self-luminous marker 71 have uniform brightness. However, there is a possibility that a peripheral portion is darker than a central portion on the light emitting surface if the diffusion plate 71d is larger than the arrangement region of the plurality of light emitting diodes 71a as described above. In this regard, a thickness of the central portion of the diffusion plate 71d is set to be thicker than that of the peripheral portion in this example. Specifically, a surface of the diffusion plate 71d opposing the light emitting diode 71a is curved in a dome shape so as to approach the substrate 71b on the central portion. That is, the shape of the diffusion plate 71d is the shape in which the central portion is thick and the peripheral portion is thin, so that attenuation of light at the central portion is increased, and uniform luminance distribution is obtained even in a narrow illumination range. In particular, since an orientation and a posture of the probe 2 change variously, it is not always possible to capture images of the self-luminous markers 71 to 77 from the front. Even in a case where images of the self-luminous markers 71 to 77 are captured from an oblique direction, the thickness of the central portion of the diffusion plate 71d is set to be thicker than that of the peripheral portion such that brightness can be made equivalent to that in a case where images of the self-luminous markers 71 to 77 are captured from the frontal direction. With such a configuration, it is possible to more accurately extract the center position information of the self-luminous markers from the marker image obtained by capturing images of the self-luminous markers 71 to 77 regardless of the orientation and posture of the probe 2.

The second to fourth marker blocks 22 to 24 are configured similarly to the first marker block 21. That is, as illustrated in FIGS. 3 to 8, the second marker block 22 includes the first to seventh self-luminous markers 81 to 87, the third marker block 23 includes the first to seventh self-luminous markers 91 to 97, and the fourth marker block 24 includes the first to seventh self-luminous markers 101 to 107.

Figure 7:
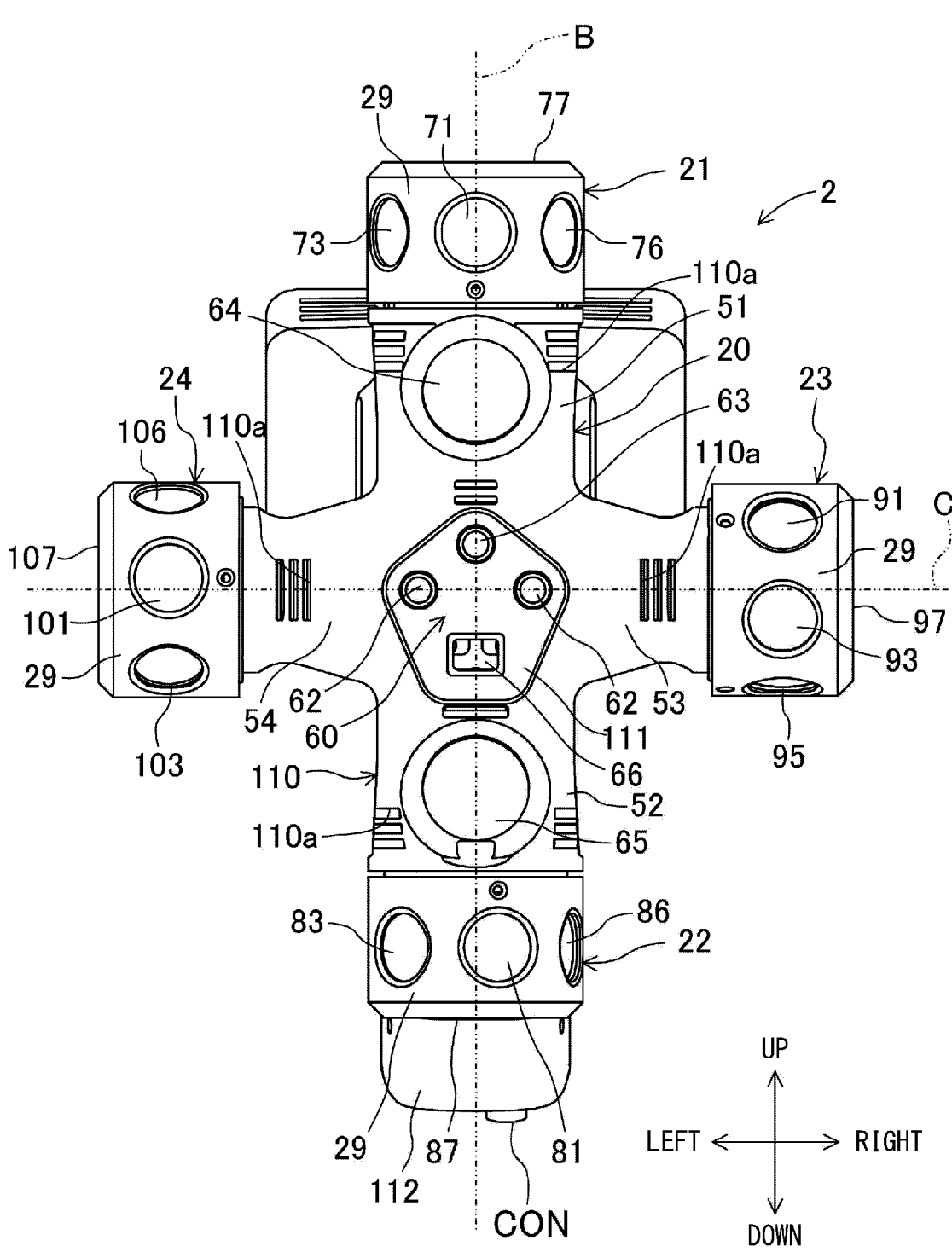
FIG. 7 is a front view of the probe.

As illustrated in FIG. 7, the first self-luminous marker 71 of the first marker block 21 and the first self-luminous marker 81 of the second marker block 22 are arranged so as to be misaligned around the straight line B. The optical axis of the first self-luminous marker 71 of the first marker block 21 and an optical axis of the first self-luminous marker 81 of the second marker block 22 face different directions. This is because a plurality of side surfaces formed in the second marker block 22 are arranged such that positions about an axis extending in the first direction (the up-down direction) are shifted from those of a plurality of side surfaces formed in the first marker block 21. Similarly, a plurality of side surfaces formed on the fourth marker block 24 are arranged such that positions about an axis extending in the second direction (the left-right direction) are shifted from those of a plurality of side surfaces formed on the third marker block 23. This makes it difficult to obtain a plurality of solutions at the time of marker image processing to be described later.

As illustrated in FIG. 12, one flexible cable CA is wired in each of the marker blocks 21 to 24. The flexible cable CA supplies power to each of the self-luminous markers 71 to 77. Specifically, one flexible cable CA extends from the optical base 61 to each of the marker blocks 21 to 24. The flexible cable CA is wired in a circular shape centered on the attachment boss 79 inside the marker block 21. The circularly wired flexible cable CA is branched into seven sub-flexible cables CA1 to CA6 (only six are illustrated in FIG. 12) in order to supply power to each of the self-luminous markers 71 to 77. Then, the sub-flexible cables CA1 to CA6 are connected to the self-luminous markers 71 to 77 via power connectors 71C to 76C (one corresponding to the self-luminous marker 77 is not illustrated) provided on substrate back surfaces of the self-luminous markers 71 to 77, respectively. Note that, similarly, a sub-flexible cable branched from the circularly wired flexible cable CA is connected to the seventh self-luminous marker 77 arranged on the other end surface 78h of the marker holder 78 via the power connector although not illustrated In this manner, by supplying power to the seven self-luminous markers 71 to 77 by the single flexible cable CA, it is possible to achieve wire saving and contribute to downsizing and weight reduction of the marker block 21 to 24 and the probe 2. Furthermore, the wire saving can suppress stress generated on the marker block 21 to 24 from wires, and thus, a temporal change generated in each of the self-luminous markers 71 to 77 can also be suppressed.

The probe body 20 includes an exterior member 110 made of resin that covers the optical base 61, the left support part 68, and the right support part 69. A front part of the exterior member 110 includes a scanner cover part 111 that covers the first scanner light source 62, the second scanner light source 63, the first scanner imaging part 64, and the second scanner imaging part 65. Further, a rear part of the exterior member 110 has the grip part 112 to be gripped by the measurement worker.

Figure 15:
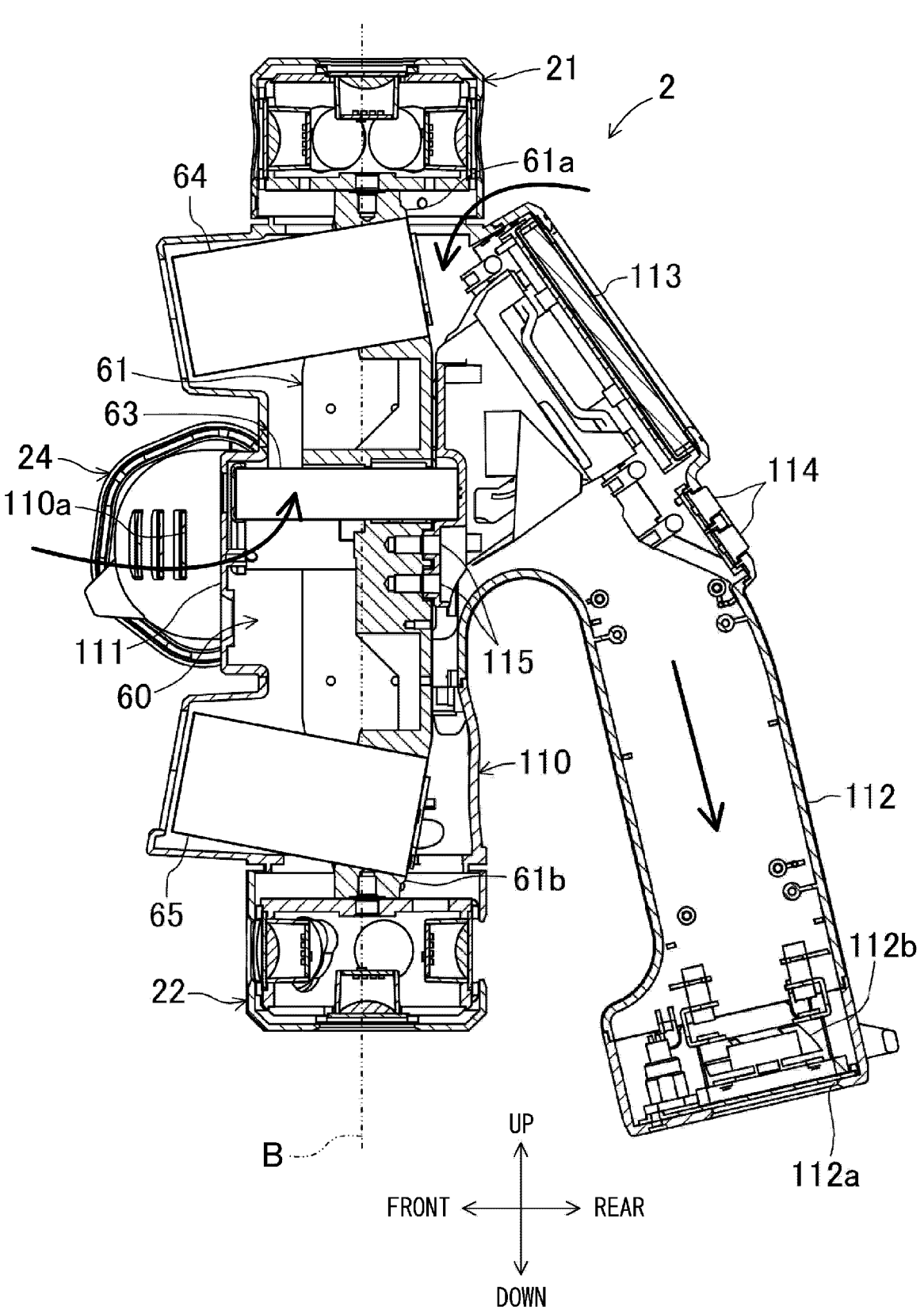
FIG. 15 is a cross-sectional view taken along line XV-XV in FIG. 5.

For example, as illustrated in FIG. 15, the grip part 112 has a shape elongated in the up-down direction, and an upper end thereof is integrated with a body part of the exterior member 110, and is provided at a position distant from the optical base 61 toward the opposite side (the rear side) to the measurement direction. A lower end of the grip part 112 is arranged so as to protrude downward of the second marker block 22. Further, the lower end of the grip part 112 is distant from the second marker block 22 in the front-rear direction. A longitudinal direction of the grip part 112 is inclined rearward with respect to the straight line B, and the grip part 112 is provided so as to be more distant from the straight line B as proceeding toward the bottom of the grip part 112. In other words, the first to fourth marker blocks 21 to 24 are positioned forward of the grip part 112, and thus, the hand of the measurement worker and the grip part 112 hardly cover the self-luminous markers 71 to 77, 81 to 87, 91 to 97, and 101 to 107 at the time of imaging by the imaging unit 3.

As illustrated in FIGS. 5 and 15, a display unit 113 for displaying a measurement result obtained by the scanner unit 60 and an operation unit 114 for operating the scanner unit 60 are provided at the upper end of the grip part 112. The display unit 113 is configured by a liquid crystal display, an organic EL display, or the like, and is arranged such that a display surface is inclined with respect to the straight line B. Further, the display surface is oriented toward a measurement subject such that the probe 2 can be moved while viewing a display content of the display unit 113.

A touch panel 113a on which a touch operation can be performed is also provided on the display surface side of the display unit 113. The operation unit 114 includes, for example, a plurality of operation buttons including a measurement start button, a measurement stop button, and the like, and is arranged below the display unit 113. The touch panel 113a can also be a part of the operation unit.

Figure 3:
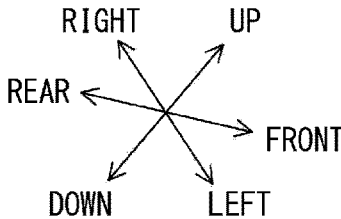
FIG. 3 is a perspective view of a probe as viewed from below.

As illustrated in FIGS. 3, 4, and the like, a plurality of arm-side vents 110a are formed in parts of the exterior member 110 corresponding to the first to fourth arm parts 51 to 54, respectively. Further, as illustrated in FIG. 5, a plurality of display-unit-side vents 110b are formed in a part of the exterior member 110 covering the display unit 113.

As illustrated in FIG. 15, the grip part 112 has a hollow shape communicating with the inside of the scanner cover part 111. As also illustrated in FIGS. 3 and 6, an air discharge port 112a for discharging air inside the grip part 112 is formed at the lower end of the grip part 112. The air discharge port 112a is opened toward a direction distant from the second marker block 22. Furthermore, a blower fan 112b is provided inside the grip part 112 in this example. The blower fan 112b is a member for forcibly discharging the air inside the grip part 112 from the air discharge port 112a. When the blower fan 112b is operated, the air sucked into the exterior member 110 from the arm-side vents 110a, the display-unit-side vents 110b, and the like of the exterior member 110 reaches the inside of the grip part 112 while cooling the scanner unit 60, the display unit 113, and the like, and is discharged from the air discharge port 112a. Thus, the inside of the probe body 20 can be forcibly air-cooled. Members generating heat, such as the scanner light sources 62 and 63, the scanner imaging parts 64 and 65, and the display unit 113, are present inside the probe body 20. Due to the generation of heat inside the probe body 20, relative positions among a plurality of components vary, and there is a possibility that the measurement accuracy decreases. When the inside of the probe body 20 is formed to be hollow and the heat inside the probe body 20 is discharged by the blower fan 112b, it is possible to suppress the decrease in the measurement accuracy. Furthermore, the air discharged from the air discharge port 112a flows in the direction distant from the second marker block 22, and thus, it is possible to suppress fluctuation of air in the vicinity of the second marker block 22 at the time of measurement.

As illustrated in FIG. 15, a central portion of the rear part of the exterior member 110 in the up-down direction is fastened and fixed to the central portion of the optical base 61 in the up-down direction by two fastening members 115. The two fastening members 115 are close to each other, and can be regarded as substantially one fastening site. That is, the central portion of the rear part of the exterior member 110 in the up-down direction is fastened and fixed to the central portion of the optical base 61 in the up-down direction by the two adjacent fastening members 115 which can be regarded as substantially one fastening site. The exterior member 110 is fastened to the optical base 61 only by the fastening members 115. As a result, it is possible to suppress distortion of each portion due to a difference in thermal expansion between the exterior member 110 and the optical base 61. Note that the exterior member 110 may be fastened and fixed to the optical base 61 by one fastening member 115.

Further, the exterior member 110 is unfastened to the respective marker holders 78 of the first to fourth marker blocks 21 to 24. The term "unfastened" means a state where the exterior member 110 is not fastened to each of the marker holders 78 with a fastening member such as a screw or a bolt. As a result, a force hardly acts on each of the marker holders 78 from the exterior member 110, and thus, the positional accuracy of the plurality of self-luminous markers 71 to 77, 81 to 87, 91 to 97, and 101 to 107 can be maintained in a high state.

Furthermore, a space is formed between the exterior member 110 and the optical base 61. The space formed between the exterior member 110 and the optical base 61 makes it possible to secure a flow path through which the heat generated inside the probe body 20 flows toward the blower fan 112b and to secure a region for wiring various cables connecting electric components such as the scanner imaging parts and scanner light source parts.

Circuit of Probe 2

Next, a circuit of the probe 2 will be described with reference to FIG. 16. The probe 2 includes a display control part 140, a marker lighting control part 141, a probe control part 142, and a storage unit 143. The display control part 140 is a part that controls the display unit 113 based on a signal output from the probe control part 142, and causes the display unit 113 to display various images, a user interface, and the like. The user's operation performed on the display unit 113 is acquired by the probe control part 142 based on a signal output from the touch panel 113a.

Further, the trigger signal generated by the trigger generation unit 38 of the imaging unit 3 is received by a communication control part 149 via a wireless communication unit 144 or a communication cable connected to the connector CON. Then, when the trigger signal is received by the communication control part 149, the probe 2 transmits the trigger signal to a trigger management unit 150 of the probe 2. The trigger management unit 150 of the probe 2 generates identification information corresponding to the trigger signal in response to the reception of the trigger signal. Since the generation of the identification information is processing similar to that of the trigger management unit 38a of the imaging unit 3, the description thereof will be omitted here.

In response to the reception of the trigger signal, the first scanner imaging part 64 and the second scanner imaging part 65 are controlled by a scanner image processing unit 147, whereby imaging is executed. As a result, imaging by the first scanner imaging part 64 and the second scanner imaging part 65, imaging of the self-luminous markers of the probe 2 by the probe imaging camera 32, lighting of the light emitting bodies 31b of the movable stage 31, and imaging of the light emitting bodies 31b by the reference camera 34 are synchronously executed according to the trigger signal.

Figure 16:
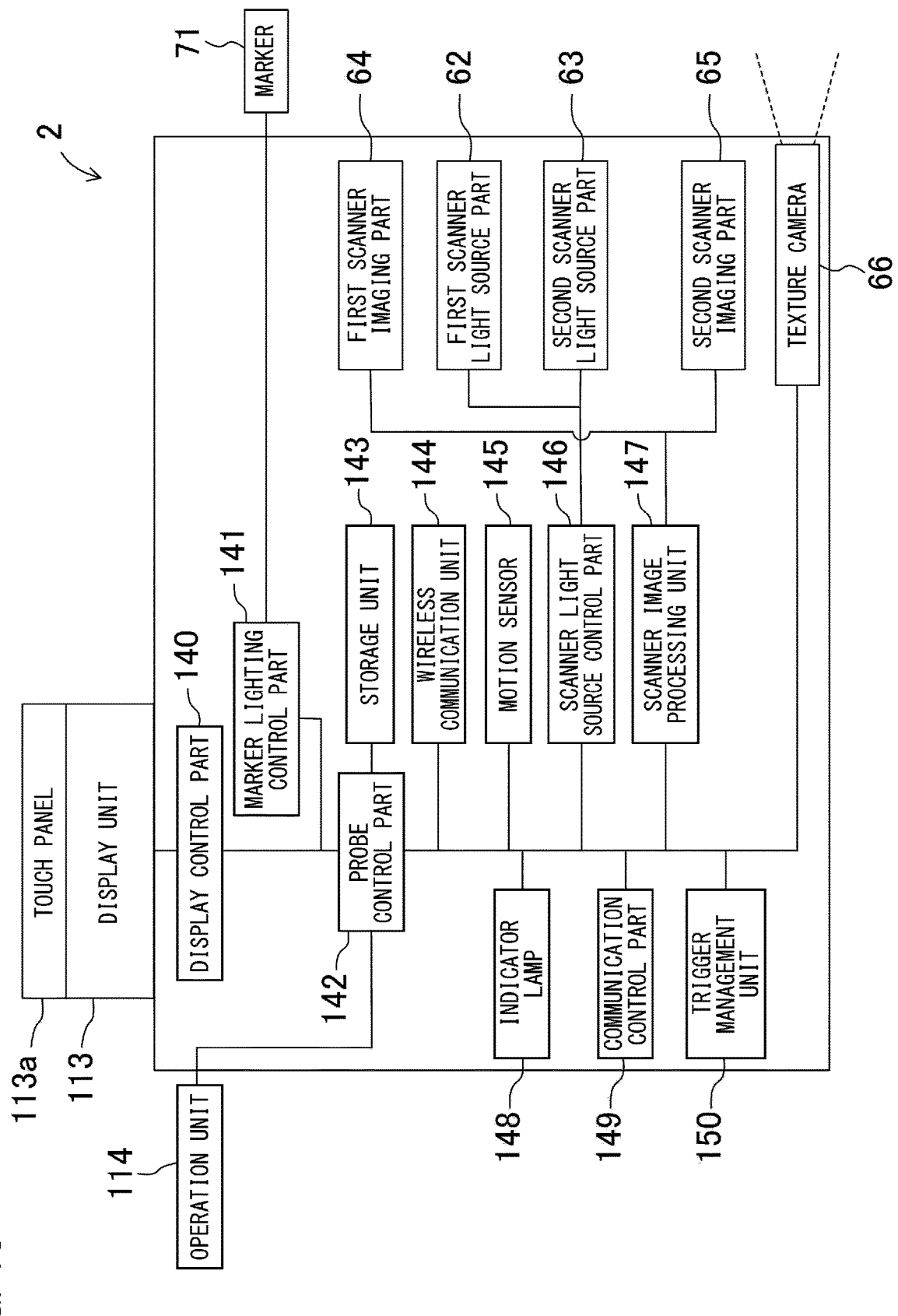
FIG. 16 is a block diagram illustrating a circuit configuration of the probe.

The marker lighting control part 141 is a part that controls the self-luminous markers 71 to 77, 81 to 87, 91 to 97, and 101 to 107 (only 71 is illustrated in FIG. 16). When the probe 2 receives the trigger signal by the communication control part 149, the marker lighting control part 141 may control the self-luminous markers 71 to 77, 81 to 87, 91 to 97, and 101 to 107 to turn on the self-luminous markers 71 to 77, 81 to 87, 91 to 97, and 101 to 107. The marker lighting control part 141 is controlled by the probe control part 142. The storage unit 143 can temporarily store a program, an image captured by the scanner unit 60, and the like.

The probe 2 includes the wireless communication unit 144 that is controlled by the probe control part 142. The wireless communication unit 144 is a communication module or the like configured to be capable of communicating with equipment other than the probe 2. In this example, the probe 2 communicates with the imaging unit 3 via the wireless communication unit 144, thereby enabling, for example, transmission and reception of various types of data such as image data captured by the scanner unit 60, various signals, and the like. Note that the probe 2 and the imaging unit 3 may be connected by a communication cable via the connector CON, and various types of data such as image data captured by the scanner unit 60, various signals, and the like may be transmitted and received via the cable. Since the probe 2 and the imaging unit 3 are wirelessly connected to each other, there is no restriction of the cable or the like, so that the portability of the probe 2 can be enhanced, and a measurement region can be expanded. Further, since the probe 2 and the imaging unit 3 are wirelessly connected, it is possible to perform high-speed and large-capacity communication, it is not necessary to accommodate a power source such as a battery, and it is possible to reduce the weight.

The probe 2 includes a motion sensor 145. The motion sensor 145 includes a sensor that detects an acceleration and an angular velocity of the probe 2, and detected values are output to the probe control part 142 and used for various types of operational processing. For example, a value output from the motion sensor 145 can be used to obtain an initial solution of the posture of the probe 2, that is, the postures of the first to fourth marker blocks 21 to 24, thereby improving the matching accuracy and improving the processing speed at the time of posture calculation. The processing using the values output from the motion sensor 145 may be executed by the imaging unit 3 or the processing unit 4.

The probe 2 includes a scanner light source control part 146 and a scanner image processing unit 147. The scanner light source control part 146 controls the first scanner light source 62 and the second scanner light source 63. When the probe 2 receives the trigger signal from the communication control part 149, the scanner light source control part 146 may control the first scanner light source 62 and the second scanner light source 63 to turn on the first scanner light source 62 and the second scanner light source 63. The first scanner light source 62 and the second scanner light source 63 are switched between the turned-on state and the turned-off state by the scanner light source control part 146. The scanner light source control part 146 is controlled by the probe control part 142. Further, the scanner image processing unit 147 controls the first scanner imaging part 64, the second scanner imaging part 65, and the texture camera 66 to execute imaging at a predetermined timing. When the probe 2 receives the trigger signal by the communication control part 149, the scanner image processing unit 147 may control the first scanner imaging part 64, the second scanner imaging part 65, and the texture camera 66 to execute imaging at a predetermined timing. Further, when the probe 2 receives a trigger signal for texture acquisition by the communication control part 149, the scanner image processing unit 147 may control the texture camera 66 to execute imaging. Here, the trigger signal may be distinguished between a trigger signal for three-dimensional shape measurement and the trigger signal for texture acquisition, and a part or all thereof may be shared. That is, the scanner image processing unit 147 may synchronously control the first scanner imaging part 64 and the second scanner imaging part 65 in response to reception of the trigger signal for three-dimensional shape measurement, and may control the texture camera 66 to execute imaging in response to reception of the trigger signal for texture acquisition.

Images captured by the first scanner imaging part 64, the second scanner imaging part 65, and the texture camera 66 are input to the scanner image processing unit 147. The scanner image processing unit 147 executes various types of image processing such as extraction of edge data on the input images.

With such a configuration, lighting of the first scanner light source 62 and the second scanner light source 63, imaging by the first scanner imaging part 64 and the second scanner imaging part 65, lighting of the self-luminous markers 71 to 77, 81 to 87, 91 to 97, and 101 to 107, imaging of the self-luminous markers 71 to 77, 81 to 87, 91 to 97, and 101 to 107 of the probe 2 by the probe imaging camera 32, lighting of the light emitting bodies 31b of the movable stage 31, and imaging of the light emitting bodies 31b by the reference camera 34 may be executed in synchronization with each other via the trigger signal.

The probe 2 includes an indicator lamp 148 and the communication control part 149. The indicator lamp 148 displays an operation state of the probe 2, and is controlled by the probe control part 142. The communication control part 149 is a part that performs processing of executing communication of, for example, image data and the like.

Measurement by Three-Dimensional Scanner 1

Figure 17:
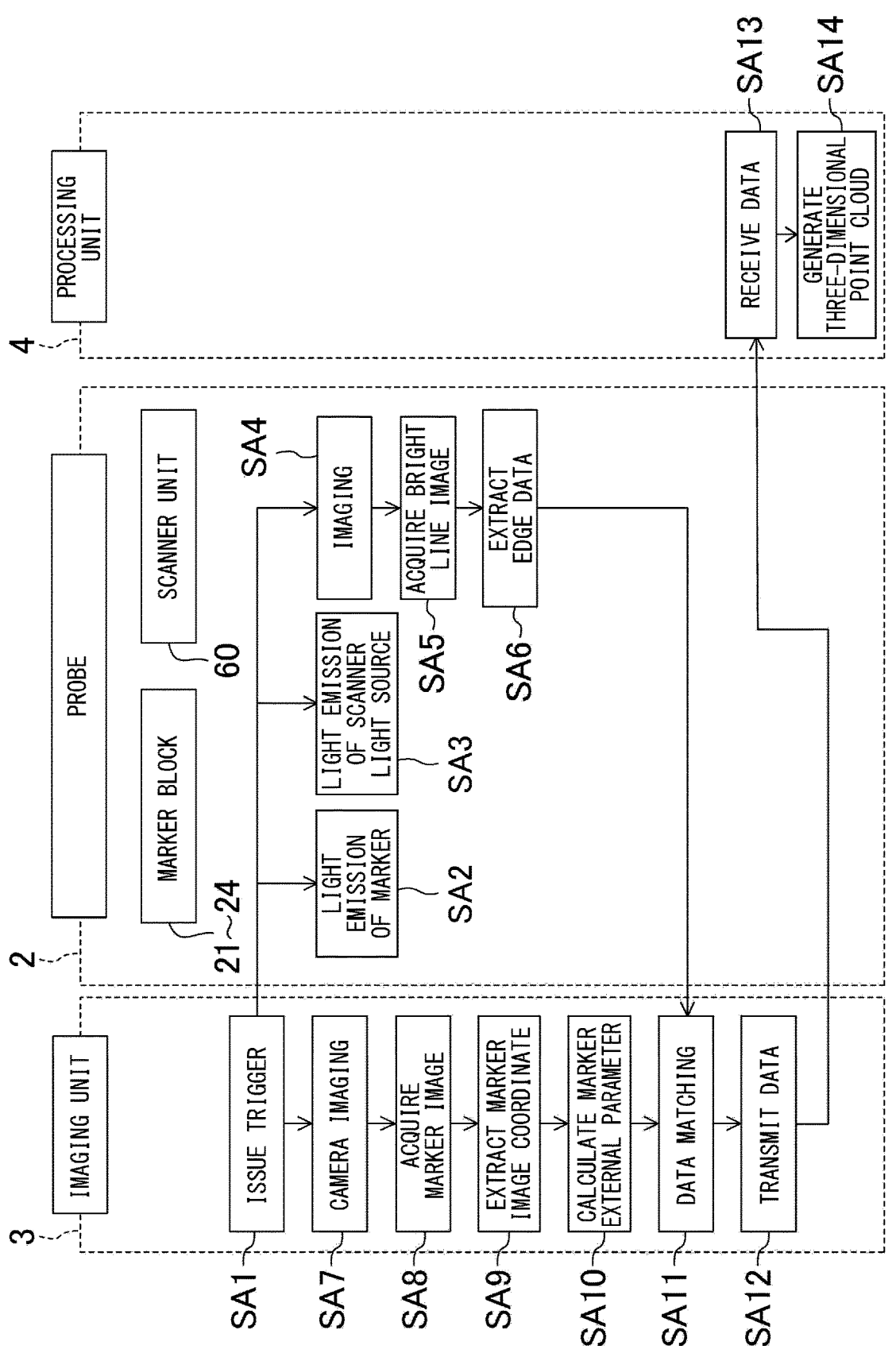
FIG. 17 is a flowchart illustrating an example of a procedure of three-dimensional shape measurement of a measurement target by the three-dimensional scanner.

Next, a procedure of three-dimensional shape measurement of the measurement target W by the three-dimensional scanner 1 configured as described above will be described with reference to a flowchart illustrated in FIG. 17. The measurement worker holds the grip part 112 of the probe 2 and orients the scanner unit 60 toward the measurement target W, and then, operates the measurement start button included in the operation unit 114. Then, in Step SA1, the trigger generation unit 38 of the imaging unit 3 issues a trigger signal. Further, in response to the generation of the trigger signal by the trigger generation unit 38, the trigger management unit 38a generates identification information corresponding to the trigger signal. This identification information serves for the trigger signal as an ID to identify an issuance timing of the trigger signal.

The trigger signal issued by the imaging unit 3 is transmitted to the probe 2 via a communication cable connected to the wireless communication unit 36 or the connector CON of the imaging unit 3. Then, the trigger signal is received by the communication control part 149 via the wireless communication unit 144 or the communication cable of the probe 2. When the probe 2 receives the trigger signal from the communication control part 149, the trigger management unit 150 of the probe 2 generates identification information corresponding to the trigger signal. In Step SA2, the probe control part 142 of the probe 2 outputs a light emission instruction to the marker lighting control part 141, and the marker lighting control part 141 causes the self-luminous markers 71 to 77, 81 to 87, 91 to 97, and 101 to 107 to emit light. In Step SA3, the probe control part 142 of the probe 2 outputs a light emission instruction to the scanner light source control part 146, and the scanner light source control part 146 causes the first scanner light source 62 or the second scanner light source 63 to emit light. Which of the first scanner light source 62 and the second scanner light source 63 is caused to emit light is determined in advance at the time of pre-setting.

Further, in Step SA4, at the same time as Step SA3, the probe control part 142 of the probe 2 outputs an imaging instruction to the scanner image processing unit 147, and the scanner image processing unit 147 causes the first scanner imaging part 64 and the second scanner imaging part 65 to execute imaging. In Step SA5, a bright line image is acquired by the imaging by the first scanner imaging part 64 and the second scanner imaging part 65. A trigger ID is assigned to the bright line image. In Step SA6, the bright line image is input to the scanner image processing unit 147, and the scanner image processing unit 147 extracts edge data from the bright line image. A trigger ID which is identification information is assigned to the edge data, and the edge data to which the trigger ID is assigned is received by the wireless communication unit 144 of the imaging unit 3 via the wireless communication unit 36 of the probe 2.

With the above configuration, lighting of the first scanner light source 62 and the second scanner light source 63, imaging by the first scanner imaging part 64 and the second scanner imaging part 65, lighting of the self-luminous markers 71 to 77, 81 to 87, 91 to 97, and 101 to 107, imaging of the self-luminous markers of the probe 2 by the probe imaging camera 32, lighting of the light emitting bodies 31b of the movable stage 31, and imaging of the light emitting bodies 31b by the reference camera 34 are executed in synchronization with each other via the trigger signal.

Meanwhile, in the imaging unit 3, after the trigger signal is issued in Step SA1, the processing proceeds to Step SA7, the body control part 33 outputs an imaging instruction to the camera image processing unit 35, and the camera image processing unit 35 causes the probe imaging camera 32 to execute imaging. At this time, the first marker block 21 and the second marker block 22 are arrayed side by side at an interval in the up-down direction, the third marker block 23 and the fourth marker block 24 are arrayed side by side at an interval in the left-right direction, the fourth marker block 24 is separated from the virtual plane D defined by the first marker block 21, the second marker block 22, and the third marker block 23, and the first to fourth marker blocks 21 to 24 include self-luminous markers 71 to 77, 81 to 87, 91 to 97, and 101 to 107 emitting light in a plurality of directions, respectively. Thus, even if the orientation and posture of the probe 2 change variously, the number of markers necessary for measurement are arranged to face the probe imaging camera 32 of the imaging unit 3. Therefore, in Step SA8, the probe imaging camera 32 can acquire a marker image including a plurality of self-luminous markers. Further, since imaging of the probe imaging camera 32 and light emission of the self-luminous markers 71 to 77, 81 to 87, 91 to 97, and 101 to 107 are executed in synchronization with the trigger signal, light emission time of the self-luminous markers 71 to 77, 81 to 87, 91 to 97, and 101 to 107 can be shortened. As a result, it is possible to suppress heat generated inside the probe body 20 by the light emission of the self-luminous markers 71 to 77, 81 to 87, 91 to 97, and 101 to 107. Note that a trigger ID is assigned to the marker image.

Here, the number of markers necessary for measurement will be described. The probe 2 may be arranged such that images of markers separated in the first direction of the probe 2 and also separated in the second direction of the probe 2 are captured by the probe imaging camera 32 even if the orientation and posture of the probe 2 change. Note that the first direction may be any one of the up-down direction, the left-right direction, and the front-rear direction, and the second direction may be any direction intersecting with the first direction. For example, in the example illustrated in FIG. 4, the fourth marker block 24 is arranged to be offset from an axis defined by the first marker block 21 and the second marker block 22. Therefore, as illustrated in FIG. 4, even if an image of the probe 2 is captured from the right side and a marker block 23 existing on the left side is hidden by a marker block 24, images of a plurality of markers separated in both the first direction and the second direction can be captured. By capturing the images of the plurality of markers separated in both the first direction and the second direction in this manner, the measurement accuracy can be enhanced in each of the up-down, left-right, and front-rear (depth) directions.

In Step SA9, the marker image is input to the camera image processing unit 35 of the imaging unit 3, and the camera image processing unit 35 extracts a marker image coordinate. In Step SA10, a marker external parameter is calculated. The marker external parameter is a six-axis parameter. Note that a trigger ID, which is identification information, is assigned to a marker image coordinate extracted in Step SA9 and the marker external parameter calculated in Step SA10. Then, in Step SA11, data matching between the edge data transmitted from the probe 2 and the marker image coordinate is executed based on the trigger ID. Details of the data matching will be described later.

In Step SA12, data obtained in Step SA11 is transmitted to the communication unit 46 of the processing unit 4 via the communication unit 37. In Step SA13, the control part 43 of the processing unit 4 processes the data transmitted from the imaging unit 3. In Step SA14, the control part 43 generates a three-dimensional point cloud. As a result, a three-dimensional shape of the measurement target W is obtained.

In this example, since the first marker block 21 and the second marker block 22 are arranged so as to sandwich the scanner unit 60, a sufficient distance between the first marker block 21 and the second marker block 22 is secured. Similarly, since the third marker block 23 and the fourth marker block 24 are arranged so as to sandwich the scanner unit 60, a sufficient distance between the third marker block 23 and the fourth marker block 24 is also secured. Thus, the distance between the self-luminous markers of which images are captured by the imaging unit 3 becomes long, and the measurement accuracy is improved.

Further, since the marker holder 78 provided in each of the first marker blocks 21 is made of the material having a lower thermal expansion coefficient than the support part 61a that supports the first marker block 21, the positional relationship of the plurality of markers 71 to 77 of the first marker block 21 is kept constant regardless of a surrounding environment, and thus the measurement accuracy is improved. The same applies to the second to fourth marker blocks 22 to 24. That is, highly accurate measurement can be performed if only the positional relationship among the first to fourth marker blocks 21 to 24 is corrected in accordance with the surrounding environment.

Details of Data Matching

Figure 18:
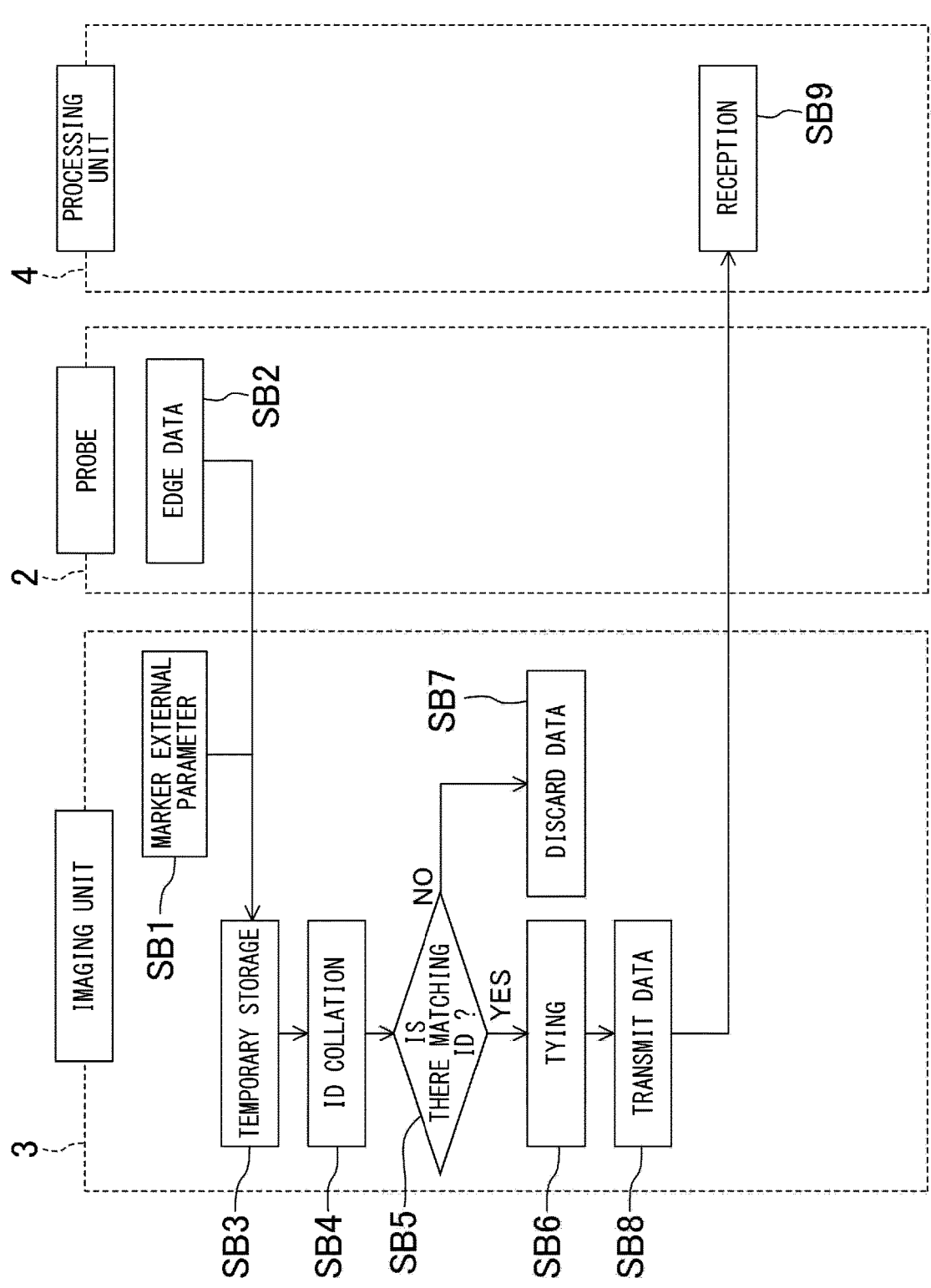
FIG. 18 is a flowchart illustrating an example of a procedure of data matching processing.

FIG. 18 is a flowchart illustrating an example of a procedure of data matching processing. In Step SB1, the imaging unit 3 acquires data of the marker external parameter calculated in Step SA10 of the flowchart illustrated in FIG. 17. Further, in Step SB2, the probe 2 acquires the edge data extracted in Step SA6 of the flowchart illustrated in FIG. 17, and transmits the edge data to the imaging unit 3. In Step SB3, the imaging unit 3 temporarily stores the marker external parameter data acquired in Step SB1 and the edge data acquired in Step SB2.

In Step SB4, ID collation between the marker external parameter data and the edge data is executed based on the trigger IDs assigned in advance. In Step SB5, it is determined whether the trigger IDs match. If the trigger IDs match, the marker external parameter data is tied to the edge data in Step SB6. If the trigger IDs do not match, the marker external parameter data and the edge data are discarded in Step SB7. After Step SB6, data transmission processing with respect to the processing unit 4 is executed in Step SB8. In Step SB9, the processing unit 4 receives the data.

Details of Temperature Correction Processing

Figure 19:
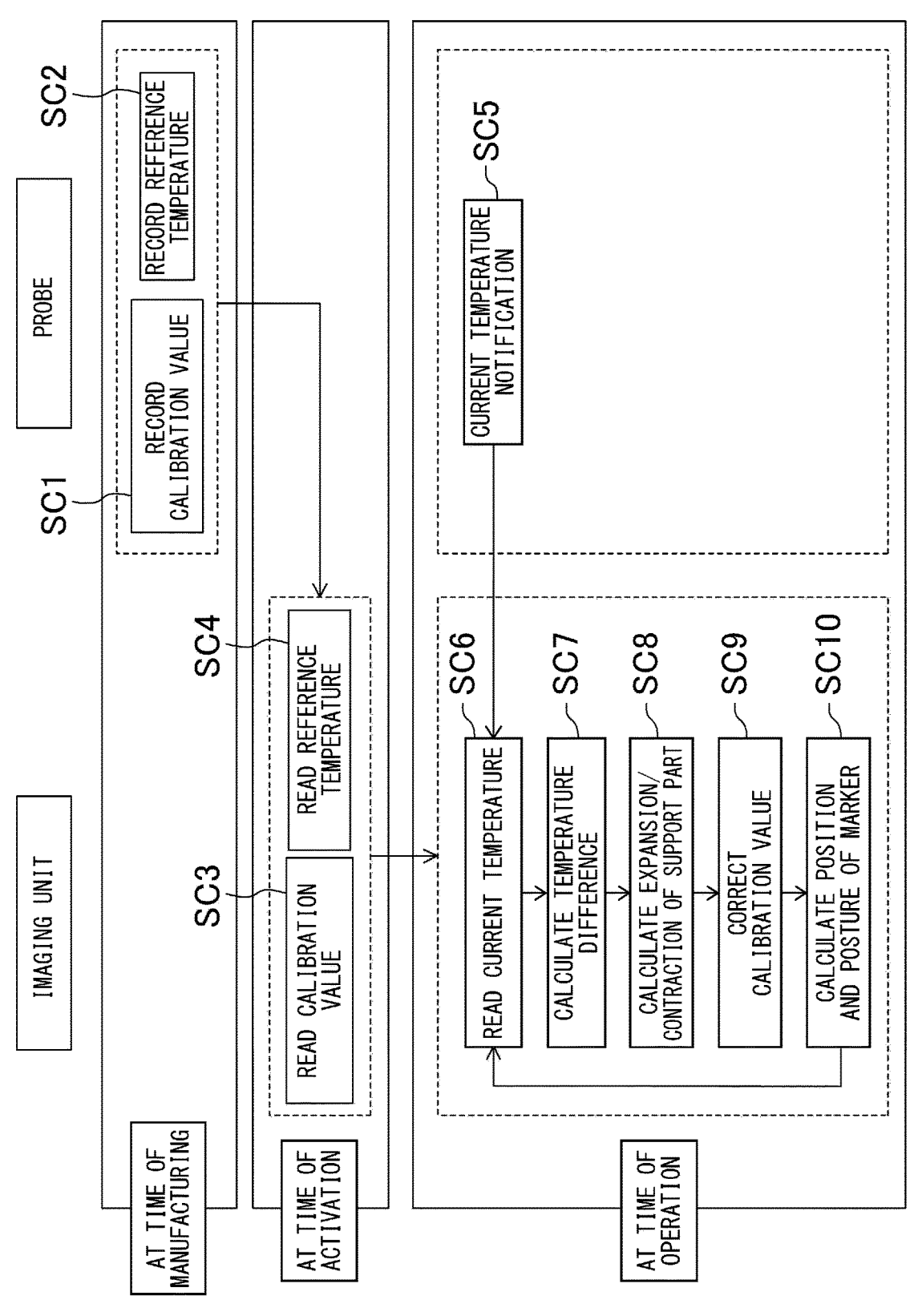
FIG. 19 is a flowchart illustrating an example of a procedure of temperature correction processing.

FIG. 19 is a flowchart illustrating a procedure of temperature correction processing. At the time of manufacturing the three-dimensional scanner 1, a calibration value is recorded in the probe 2 in Step SC1, and a reference temperature is recorded in the probe 2 in Step SC2. That is, an origin and a coordinate system are placed at the center of gravity of markers on design, three-dimensional coordinates in the coordinate system are assigned to the respective markers by calibration, and a temperature during the calibration is recorded.

When the user activates the three-dimensional scanner 1, the imaging unit 3 reads the calibration value from the probe 2 in Step SC3, and the imaging unit 3 reads the reference temperature from the probe 2 in Step SC4.

When the operation of the three-dimensional scanner 1 is started, in Step SC5, output values from the temperature sensors S1 to S4 (illustrated in FIG. 8) built in the probe 2 are read, and the imaging unit 3 is notified of them as a current temperature. The current temperature corresponds to the environmental temperature of the probe 2. The imaging unit 3 reads the current temperature notified from the probe 2 in Step SC6. In Step SC7, the imaging unit 3 calculates a temperature difference between the reference temperature and the current temperature. In Step SC8, an amount of expansion/contraction, that is, a dimensional change amount of each of the support parts 61a, 61b, 68, and 69 is calculated based on the environmental temperature, the calibration value, thermal expansion coefficients, and the like. In Step SC9, the imaging unit 3 corrects the calibration value based on the temperature difference. In Step SC10, positions and postures of the markers are calculated based on the calibration value corrected in Step SC9, and the calculated positions and postures are used as misalignment information. Steps SC5 to SC10 are repeatedly executed in a predetermined short cycle. When the operation of the three-dimensional scanner 1 is stopped, this flow ends.

Functions and Effects of Embodiment

As described above, the first marker block 21 and the second marker block 22 that are arrayed in the up-down direction so as to sandwich the scanner unit 60 and the third marker block 23 and the fourth marker block 24 that are arrayed in the left-right direction so as to sandwich the scanner unit 60 are provided, and the fourth marker block 24 is separated from the virtual plane D defined by the first to third marker blocks 21 to 23. Thus, even if the orientation and posture of the probe 2 change variously, the imaging unit 3 can capture images of the number of self-luminous markers necessary for measurement, and a sufficient distance between the captured markers can be secured. As a result, it is possible to further obtain more favorable measurement workability by further enhancing the degree of freedom in handling the probe 2 while enhancing the measurement accuracy.

Further, the first to fourth marker blocks 21 to 24 are supported by the support parts 61a, 61b, 68, and 69 made of metal and each of the first to fourth marker blocks 21 to 24 has the marker holder 78 that positions and fixes the self-luminous markers 71 to 77, 81 to 87, 91 to 97, and 101 to 107 facing the plurality of directions, respectively, and is made of the material having a lower thermal expansion coefficient than the support parts 61a, 61b, 68, and 69. Thus, it is possible to improve the measurement accuracy by maintaining the positional relationship of the plurality of self-luminous markers 71 to 77, 81 to 87, 91 to 97, and 101 to 107 constant regardless of the surrounding environment while solving the problems of cost and weight.

As described above, the first marker block 21 and the second marker block 22 that are arrayed in the up-down direction so as to sandwich the scanner unit 60 and the third marker block 23 and the fourth marker block 24 that are arrayed in the left-right direction so as to sandwich the scanner unit 60 are provided, and the fourth marker block 24 is separated from the virtual plane D defined by the first to third marker blocks 21 to 23. Thus, even if the orientation and posture of the probe 2 change variously, the imaging unit 3 can capture images of the number of self-luminous markers necessary for measurement, and a sufficient distance between the captured markers can be secured. As a result, it is possible to further obtain more favorable measurement workability by further enhancing the degree of freedom in handling the probe 2 while enhancing the measurement accuracy.

Further, the first to fourth marker blocks 21 to 24 are supported by the support parts 61a, 61b, 68, and 69 made of metal and each of the first to fourth marker blocks 21 to 24 has the marker holder 78 that positions and fixes the self-luminous markers 71 to 77, 81 to 87, 91 to 97, and 101 to 107 facing the plurality of directions, respectively, and is made of the material having a lower thermal expansion coefficient than the support parts 61a, 61b, 68, and 69. Thus, it is possible to improve the measurement accuracy by maintaining the positional relationship of the plurality of self-luminous markers 71 to 77, 81 to 87, 91 to 97, and 101 to 107 constant regardless of the surrounding environment while solving the problems of cost and weight.

The above-described embodiment is merely an example in all respects, and should not be construed as limiting. Furthermore, all modifications and changes belonging to the equivalent range of the claims fall within the scope of the invention.

As described above, the present invention can be used in the case of measuring three-dimensional shapes of various measurement targets.

What is claimed is:

1. A probe for a three-dimensional scanner having a plurality of markers of which images are captured by an imaging unit, the probe comprising:
a scanner unit including a scanner light source that emits pattern light in a measurement direction and a scanner imaging part that captures an image of the pattern light emitted by the scanner light source in the measurement direction to generate a bright line image;
a pair of marker blocks including a first marker block and a second marker block arrayed side by side in a first direction in a state where the scanner unit is positioned at a central portion between the first marker block and the second marker block; and
a pair of marker blocks including a third marker block and a fourth marker block arrayed side by side in a second direction in a state where the scanner unit is positioned at a central portion between the third marker block and the fourth marker block,
wherein each of the marker blocks has self-luminous markers facing a plurality of directions, respectively,
the fourth marker block is arranged to be separated from a plane defined by the first marker block, the second marker block, and the third marker block, and
the pair of marker blocks including the third marker block and the fourth marker block is provided at positions offset from the scanner unit in the measurement direction.

2. The probe for a three-dimensional scanner according to claim 1, wherein the pair of marker blocks including the first marker block and the second marker block is provided at both ends of a probe body in a longitudinal direction.

3. The probe for a three-dimensional scanner according to claim 1, wherein an array direction of the pair of marker blocks including the first marker block and the second marker block and an array direction of the pair of marker blocks including the third marker block and the fourth marker block are orthogonal to each other as the probe is viewed from the measurement direction.

4. The probe for a three-dimensional scanner according to claim 1, wherein a first surface and a second surface farthest from the first surface among surfaces of each of the pair of marker blocks are parallel to each other, and the self-luminous marker is arranged on each of the first surface and the second surface.

5. The probe for a three-dimensional scanner according to claim 4, wherein a plurality of side surfaces intersecting the first surface and the second surface are formed in each of the pair of marker blocks, and the self-luminous marker is arranged on each of the side surfaces.

6. The probe for a three-dimensional scanner according to claim 5, wherein
the plurality of side surfaces are formed in each of the first marker block and the second marker block, and
the plurality of side surfaces formed in the second marker block are arranged at positions about an axis extending in the first direction, the positions being shifted from the plurality of side surfaces formed in the first marker block.

7. The probe for a three-dimensional scanner according to claim 1, further comprising:
an optical base to which the scanner light source and the scanner imaging part are attached; and
a grip part,
wherein the grip part is arranged to be distant from the optical base toward a side opposite to the measurement direction.

8. The probe for a three-dimensional scanner according to claim 7, wherein the grip part is provided with a display unit configured to display a measurement result obtained by the scanner unit.

9. The probe for a three-dimensional scanner according to claim 7, wherein the grip part is provided with an operation unit configured to operate the scanner unit.

10. The probe for a three-dimensional scanner according to claim 1, wherein
the scanner unit includes a first scanner light source that emits multi-line light and a second scanner light source that emits single-line light as the scanner light source, and
a light amount of the single-line light emitted from the second scanner light source is larger than a light amount of each beam of the multi-line light emitted from the first scanner light source.

11. A probe for a three-dimensional scanner having a plurality of markers of which images are captured by an imaging unit, the probe comprising:
a scanner unit including a scanner light source that emits pattern light in a measurement direction and a scanner imaging part that captures an image of the pattern light emitted by the scanner light source in the measurement direction to generate a bright line image;
a pair of marker blocks including a first marker block and a second marker block arrayed side by side in a first direction in a state where the scanner unit is positioned at a central portion between the first marker block and the second marker block; and a pair of marker blocks including a third marker block and a fourth marker block arrayed side by side in a second direction in a state where the scanner unit is positioned at a central portion between the third marker block and the fourth marker block, wherein a first axis extending between the first marker block and the second marker block in the first direction and a second axis extending between the third marker block and the fourth marker block in the second direction are arranged to be orthogonal to each other as viewed from the measurement direction, and the first axis and the second axis are in a skewed positional relationship, and each of the marker blocks has self-luminous markers facing a plurality of directions, respectively.

12. The probe for a three-dimensional scanner according to claim 11, wherein the probe includes a support part that supports each of the marker blocks with respect to the scanner unit, a marker holder has a polygonal column shape in which one surface forms an attachment surface to be attached to the support part, and at least one of the self-luminous markers is provided on each surface other than the attachment surface.

13. The probe for a three-dimensional scanner according to claim 12, wherein one end surface of the marker holder in an axial direction is the attachment surface, and at least one of the self-luminous markers is provided on another end surface of the polygonal column shape in the axial direction.

14. The probe for a three-dimensional scanner according to claim 11, wherein an outer shape of each of the plurality of the self-luminous markers is defined by a plate and a light-shielding mask formed on the plate.

15. A probe for a three-dimensional scanner having a plurality of markers of which images are captured by an imaging unit, the probe comprising:

a scanner unit including a scanner light source that emits pattern light in a measurement direction and a scanner imaging part that captures an image of the pattern light emitted by the scanner light source in the measurement direction to generate a bright line image;

a pair of marker blocks including a first marker block and a second marker block arrayed side by side in a first direction in a state where the scanner unit is positioned at a central portion between the first marker block and the second marker block, and each of the first and second marker blocks comprises a plurality of self-luminous markers, and includes an end surface oriented to intersect a first axis, extending between the first marker block and the second marker block in the first direction, and at least one side surface different from the end surface and arranged around the first axis; and a pair of marker blocks including a third marker block and a fourth marker block arrayed side by side in a second direction in a state where the scanner unit is positioned at a central portion between the third marker block and the fourth marker block, and each of the third and fourth marker blocks comprises a plurality of self-luminous markers, and includes an end surface oriented to intersect a second axis, extending between the third marker block and the fourth marker block in the second direction, and at least one side surface different from the end surface and arranged around the second axis, wherein the first axis and the second axis are in a skewed positional relationship, each of the first marker block and the second marker block has at least one of the self-luminous markers on the end surface oriented to intersect the first axis and at least another of the self-luminous markers on the side surface around the first axis, and each of the third marker block and the fourth marker block has at least one of the self-luminous markers on the end surface oriented to intersect the second axis and at least another of the self-luminous markers on the side surface around the second axis.

16. The probe for a three-dimensional scanner according to claim 15, wherein the probe includes a support part that supports each of the marker blocks with respect to the scanner unit, a marker holder has a polygonal column shape in which one surface forms an attachment surface to be attached to the support part, and at least one of the self-luminous markers is provided on each surface other than the attachment surface.

17. The probe for a three-dimensional scanner according to claim 16, wherein one end surface of the marker holder in an axial direction is the attachment surface, and at least one of the self-luminous markers is provided on another end surface of the polygonal column shape in the axial direction.

18. The probe for a three-dimensional scanner according to claim 15, wherein an outer shape of each of the plurality of self-luminous markers is defined by a plate and a light-shielding mask formed on the plate.

* * * * *